United States Patent [19]
Okamoto et al.

[11] Patent Number: 5,957,586
[45] Date of Patent: *Sep. 28, 1999

[54] ROLLING GUIDE UNIT

[75] Inventors: Isao Okamoto, Higashi-Murayama; Takeki Shirai, Ichikawa, both of Japan

[73] Assignee: THK Co. Ltd., Tokyo, Japan

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/868,067

[22] Filed: Jun. 3, 1997

Related U.S. Application Data

[62] Division of application No. 08/404,925, Mar. 15, 1995, Pat. No. 5,716,139.

[30] Foreign Application Priority Data

Mar. 18, 1994 [JP] Japan .................................. 6-72950

[51] Int. Cl.⁶ .................................................. F16C 31/06
[52] U.S. Cl. ............................................................ 384/45
[58] Field of Search ................................. 384/43, 44, 45, 384/48, 49

[56] References Cited

U.S. PATENT DOCUMENTS

| | | | |
|---|---|---|---|
| 1,898,273 | 2/1933 | Stevens | 384/48 |
| 2,047,868 | 7/1936 | Harley | 384/49 |
| 4,582,369 | 4/1986 | Itoh | 384/45 X |
| 4,616,886 | 10/1986 | Teramachi | 384/45 |
| 5,240,331 | 8/1993 | Ninomiya et al. | 384/45 |
| 5,273,365 | 12/1993 | Kondoh | 384/45 |

FOREIGN PATENT DOCUMENTS

| | | |
|---|---|---|
| 39 31 351 A1 | 3/1991 | Germany . |
| 41 32 320 | 4/1992 | Germany . |
| 41 34 864 | 4/1992 | Germany . |
| 42 09 824 | 3/1993 | Germany . |
| 102714 | 4/1992 | Japan . |
| 2 139 298 | 11/1984 | United Kingdom . |

*Primary Examiner*—Thomas R. Hannon
*Attorney, Agent, or Firm*—Armstrong, Westerman, Hattori, McLeland & Naughton

[57] ABSTRACT

A rolling guide unit comprises a movable member provided with a pair of support portions extending from lateral end portions of a main body portion so as to provide a recessed portion between the main body portion and both the support portions, a guide rail disposed in the recessed portion of the movable member so that side surfaces of the guide rail face the inner surfaces of the support portions, respectively, and a number of rolling members disposed to be rollable between corresponding rolling member rolling grooves formed to the guide rail and the support portions of the movable member so that each of the rolling members contact the rolling member rolling grooves at two contact points and the rolling members apply load to the rolling member rolling grooves, the movable member and the guide rail being relatively movable through the rolling of the rolling members. Each of the rolling member rolling grooves has an arcuate shape in section having radius of curvature larger than that of the rolling member and the contact points are displaceable along the arcuate shape of the rolling member rolling groove.

32 Claims, 17 Drawing Sheets

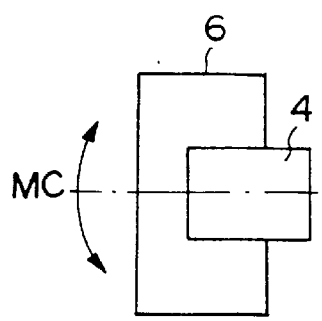
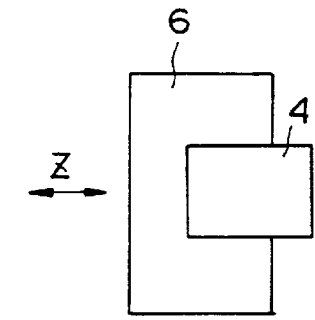
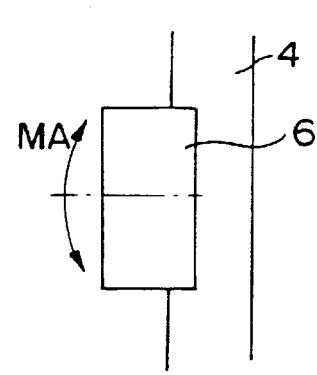
FIG. 6A  FIG. 6B  FIG. 6C
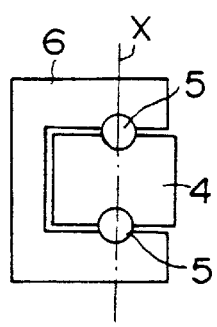
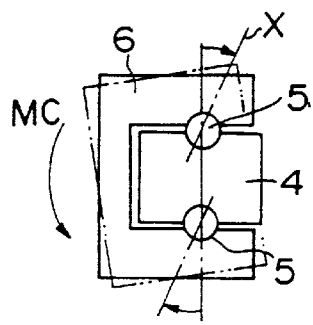
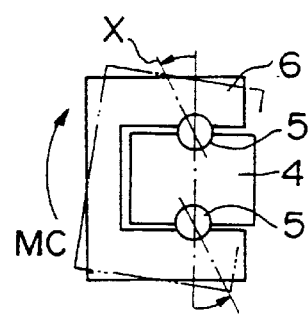
FIG. 6D  FIG. 6E  FIG. 6F
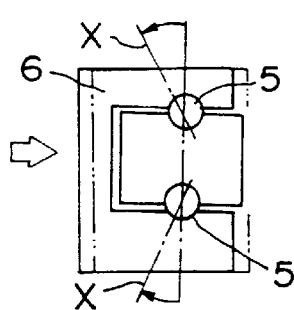
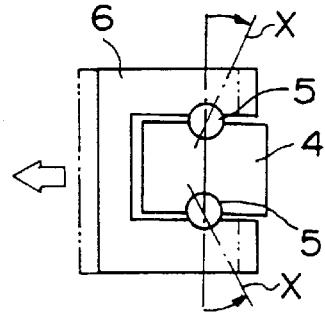
FIG. 6G  FIG. 6H

ROLLING GUIDE UNIT

This is a divisional of application Ser. No. 08/404,925 filed Mar. 15, 1995, now U.S. Pat. No. 5,716,139.

BACKGROUND OF THE INVENTION

The present invention relates to a rolling guide unit of rolling contact type linear or curved, such as circular, guide passage, particularly capable of being excellent in misalignment adjustment performance.

As a known example of such rolling guide unit, there is provided an example shown in FIG. 22 in which a rolling guide unit 100 is disposed so as to guide a table 102 with respect to a fixed base 101.

The rolling guide unit 100 is assembled in a manner that a movable member 104 having a U-shape in cross section is provided with a pair of upper and lower support portions 103 extending in a lateral direction, i.e. longitudinal direction of the movable member, and upper and lower surfaces of a guide rail disposed in the U-shaped hollow portion of the movable member 104 are supported by the support portions through upper and lower two rows of balls 106. In general, high rigidity is required for such rolling guide unit, and in the known art, the rigidity in every direction including vertical and horizontal directions is made high by applying a preload to the balls 106 and forming projecting ribs 107 to the upper and lower side surfaces of the guide rail 105 so as to project therefrom thereby to clamp the ribs 107 by the respective two rows of the balls 106 from the upper and lower directions thereof. Particularly, in the illustrated example, in order to equally support the load in the every direction, a contact angle α of a line X connecting contacting points of the ball 106 to two ball rolling grooves with respect to a virtual horizontal line is set to 45°.

The known rolling guide unit of the type shown in FIG. 22, however, has high rigidity, and accordingly, when a working error, for example, an angular error θ and a dimensional error Δ in the horizontal direction, is caused to a mounting surface of the movable member 104, a misalignment is caused between the guide rail 105 and the movable member 104 at the time of clamping and fixing the rolling guide unit between the table 102 and the fixed base 101. Such misalignment constitutes a cause of an application of excessive force to the movable member 104, resulting in the increasing of a sliding resistance and abrasion of the balls 106 and the ball rolling groves, thus providing a problem.

Such misalignment will be avoided by increasing the working performance of the respective members of the rolling guide unit. However, the increasing of the working performance has a limit itself and involves cost increasing.

In the meantime, the misalignment will be somewhat reduced by making small the preload to be applied to the balls 106, but the high rigidity of the rolling guide unit will be reduced by making small the preload to be applied. As mentioned above, the requirement of the high supporting rigidity is contrary to the reduction of the misalignment of the members, and hence, in the prior art construction, it is difficult to satisfy both the requirements for the realization of the high rigidity and the less misalignment.

SUMMARY OF THE INVENTION

An object of the present invention is to substantially eliminate defects or drawbacks encountered in the prior art described above and to provide a rolling guide unit capable of absorbing misalignment in a horizontal direction while maintaining vertical rigidity of the unit and also maintaining an allowable load bearing ability.

This and other objects can be achieved according to the present invention by providing a rolling guide unit comprising:

a movable member provided with a main body portion and a pair of support portions extending from lateral end portions of the main body portion so as to provide a recessed portion between the central portion and both the support portions, the support portions having inner surfaces to which rolling member rolling grooves are formed;

a guide rail disposed in the recessed portion of the movable member so that side surfaces of the guide rail face the inner surfaces of the support portions, respectively, the side surfaces of the guide rail being formed with rolling member rolling grooves at portions corresponding to the rolling member rolling grooves of the support portions, respectively; and a number of rolling members disposed to be rollable between the corresponding rolling member rolling grooves of the guide rail and the support portions of the movable member so that each of the rolling members contact the rolling member rolling grooves at two contact points and the rolling members apply load to the rolling member rolling grooves, the movable member and the guide rail being relatively movable through the rolling of the rolling members;

wherein each of the rolling member rolling grooves has an arcuate shape in section having radius of curvature larger than that of the rolling member and the contact points are displaceable along the arcuate shape of the rolling member rolling groove.

In preferred embodiments, the rolling member is a ball and each of the rolling member rolling grooves has a depth of approximately ¼ to ½ of a diameter of the ball.

A plurality of rolling member rolling grooves are formed at least one of the side surfaces of the guide rail and at least corresponding one inner surface of the support portion of the movable member.

An initial contact angle constituted by a line connecting the two contact points of the rolling members to the rolling member rolling grooves and a horizontal line passing a center of the rolling member is set substantially 90°.

A plurality of rolling member rolling grooves are formed at least one of the side surfaces of the guide rail and at least corresponding one inner surface of the support portion of the movable member, and an initial contact angle constituted by a line connecting the two contact points of the rolling members in at least one of the plurality of rolling member rolling grooves to this rolling member rolling groove and a horizontal line passing a center of the rolling member is set so as to have an inclination by a predetermined angle with respect to the angle of substantially 90°. All the rolling members disposed in the plurality of rolling member rolling grooves have contact angles inclined in the same direction or in directions reverse to each other.

A plurality of rolling member rolling grooves are formed at least one of the side surfaces of the guide rail and at least corresponding one inner surface of the support portion of the movable member, and the rolling members disposed in at least one of the plurality of rolling member rolling grooves are formed as tubular members and the rolling member rolling groove in which the tubular members are rolled is formed so as to provide a flat groove bottom. The rolling member rolling grooves for the tabular members are formed to the inner surfaces of the support portions so as to provide a groove bottom shape corresponding to an outer shape of the tubular member and the side surfaces of the guide rail for the tubular members are formed to be flat. Three rows of the rolling member grooves are formed and a central one is formed for the tubular members.

The guide rail has substantially rectangular cross section and is bent in a curved shape or has substantially linear shape.

Retainer means are disposed between the facing inner surfaces of the support portions of the movable member and the side surfaces of the rail guide.

The support portions are integrally formed with the main body portion of the movable member. The support portions may be independently formed with the main body portion of the movable member and the support portions are fixed to the main body portion of the movable member by means of bolts. The support portions have extending lengths different from each other and the numbers of rows of the rolling members of the respective support portions are different from each other.

According to the structures and characters of the rolling guide unit according to the present invention described above, the vertical load is born by the rolling members disposed between the upper and lower, as viewed in the illustrations of the drawings, support portions of the movable member and the guide rail. Particularly, in an arrangement in which the initial contact angle of the rolling member is set to approximately 90°, a vertical large load can be effectively born. When a horizontal load is applied, the contact points of the rolling member to the rolling member rolling groove are displaced to change the contact angle by the load balance between the vertical load and the horizontal, i.e. Lateral, load, thereby to effectively bear both the loads.

With respect to the misalignment in the horizontal direction, the contact points of the rolling members are displaced along the arcuate shape of the rolling member rolling groove thereby to absorb the misalignment.

Since the rolling member rolling groove has an arcuate shape in section, the allowable load is represented by a sine function with a contact angle being variable. According to the present invention, the contact angle is set to a value near 90- about which the sine function shows a curve having a gentle variation, so that the allowable load varies small in amount even if the contact angle varies.

Since the depth of the rolling member rolling groove is set to a value approximately ¼ to ½ of the diameter of the rolling member such as ball, the ball does not contact the edge portions of the groove even if the contact points are displaced, and hence, the edge load is eliminated.

Furthermore, according to the present invention, the guide rail can be prevented from forming with a complicated cross section such as provided with projection ribs as in a conventional structure and the rolling member rolling grooves can be worked through a horizontal grinding working. Particularly, when the guide rail having a curved shape is formed, it can be formed so as to provide a simple rectangular shape, thus being uniformly bent.

In the case of contact angle of 90°, the contact points are displaced by the application of the horizontal load, and the variation of the contact points can be absorbed immediately by changing the initial contact angle in accordance with the load to be applied. The contact angle can be changed to an optional value by applying a horizontal load of predetermined amount, and for example, the horizontal load can be born by setting the contact angle to, for example, 30° or 45° in accordance with the load to be applied. In such case, since the contact points of the rolling member to the rolling member rolling groove can be displaceable, the misalignment can be effectively absorbed.

The nature and further characters of the present invention will be made more clear through the following descriptions made with reference to the accompanying drawings.

BRIEF DESCRIPTION OF THE DRAWINGS

In the accompanying drawings:

FIG. 1 represents one embodiment of a rolling guide unit according to the present invention, in which

FIG. 2 includes FIGS. 2A, 2B and 2C, in which

FIG. 4 includes FIGS. 4A and 4B, in which

FIG. 5 includes FIGS. 5A, 5B and 5C, in which

FIG. 6 includes FIGS. 6A to 6H for the explanatory of steps for absorption of misalignment by means of the rolling guide unit according to the present invention in this order;

FIG. 8 represents a further embodiment of the rolling guide unit according to the present invention, in which FIG. 8A is a side view thereof and FIGS. 8 to 8E show various types of rolling members;

FIG. 9 represents an embodiment of a rolling guide unit of linear guide type according to the present invention, in which

DESCRIPTION OF THE PREFERRED EMBODIMENTS

It is first to be noted that the terms "upper" and "lower" used herein for the following respective embodiments or examples are made with reference to the corresponding illustrations of the accompanying drawings.

Figure 1A:
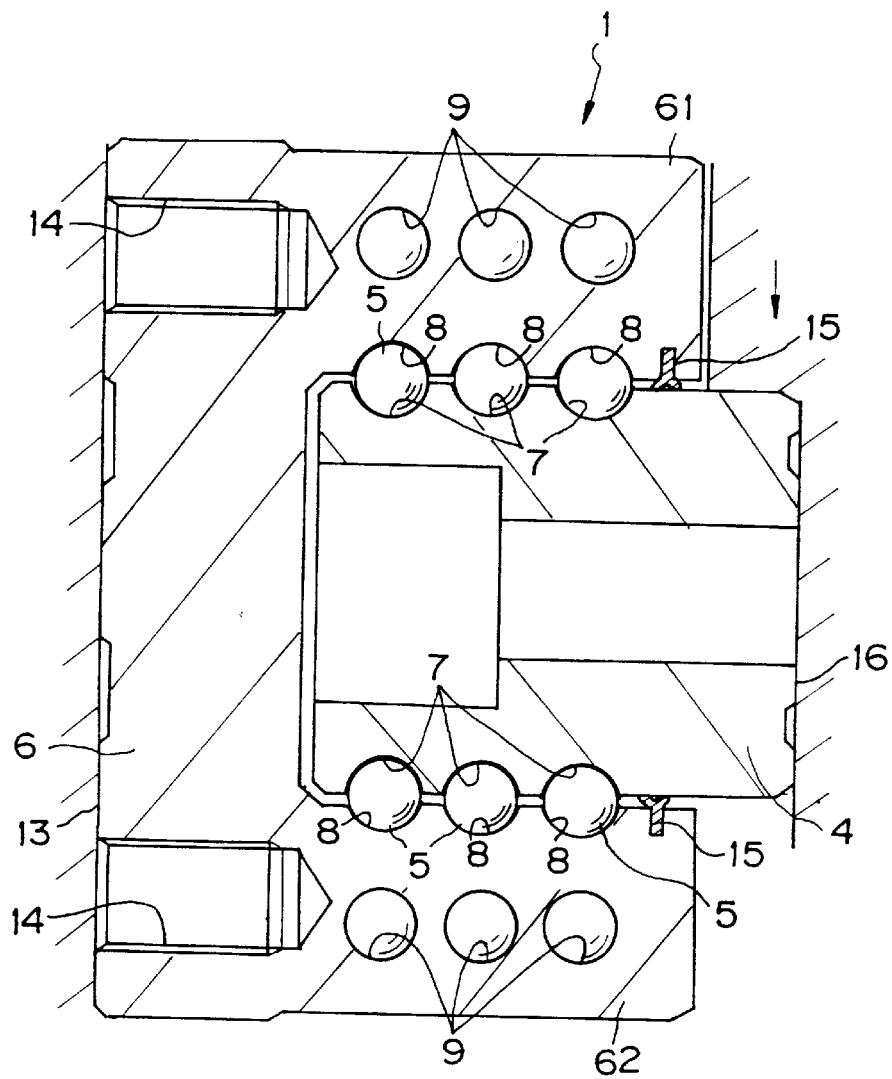
FIG. 1A is a cross-sectional view of the guide unit.
Figure 2A:
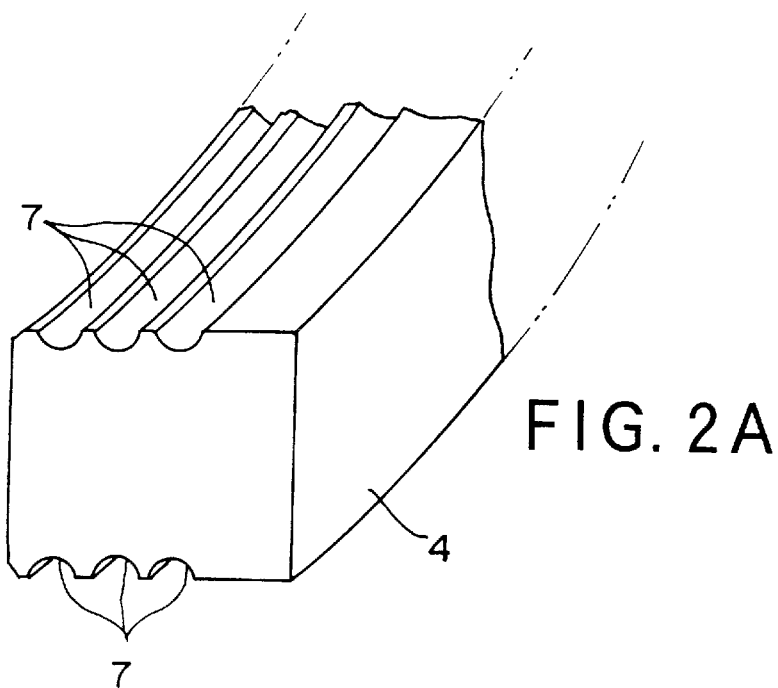
FIG. 2A is a perspective view of a portion of a guide rail of the guide unit in FIG. 1A.
Figure 2B:
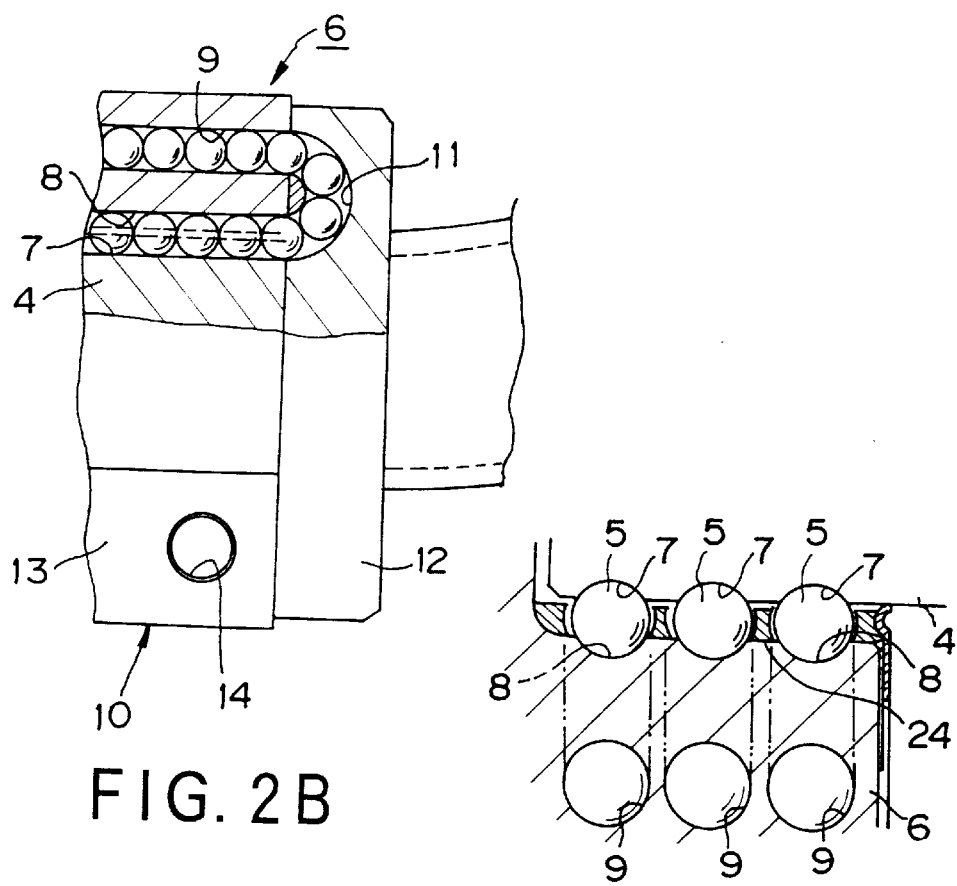
FIG. 2B is a side view, partially broken away, of FIG. 2A.
Figure 2C:
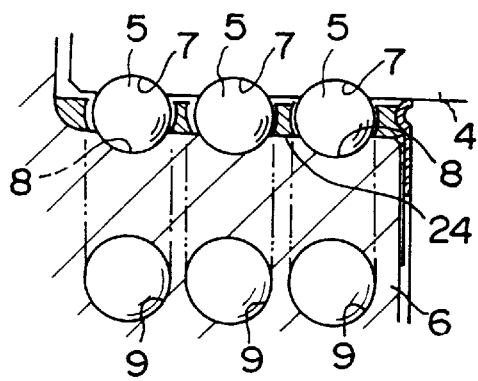
FIG. 2C is a partial sectional view showing an assembled arrangement of a retainer.
Figure 3:
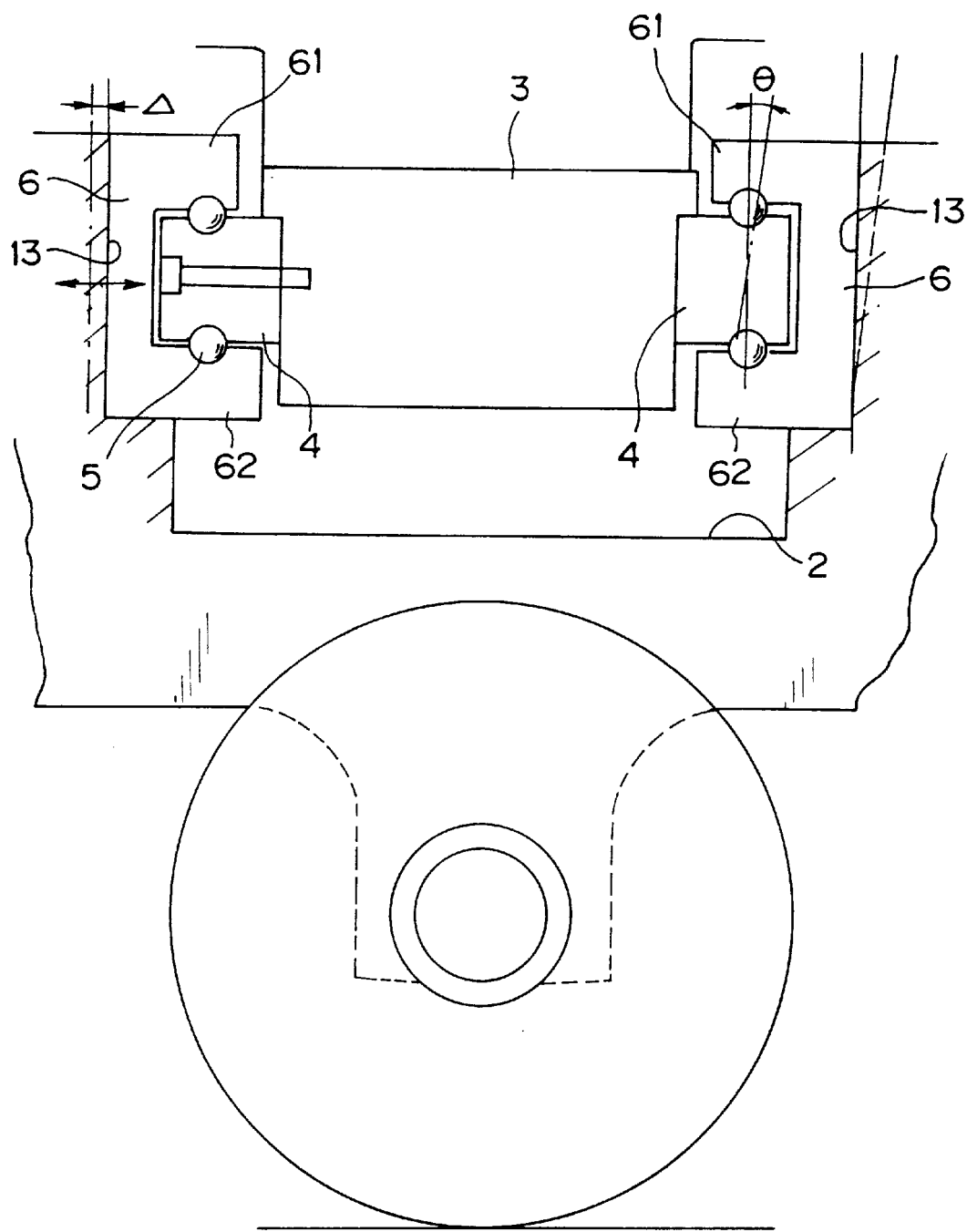
FIG. 3 is an illustration of a support portion for a railway rolling stock to which the rolling guide unit of the present invention is applicable.
Figure 4A:
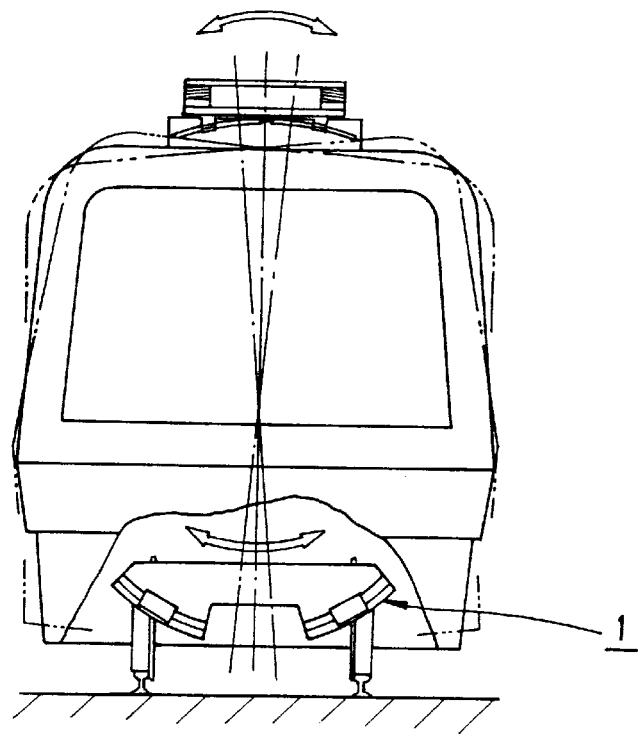
FIG. 4A is an illustration of an entire railway rolling stock to which the rolling guide unit of the present invention is applicable and FIG. 4B is an enlarged view of the rolling guide unit of FIG. 4A.
Figure 4B:
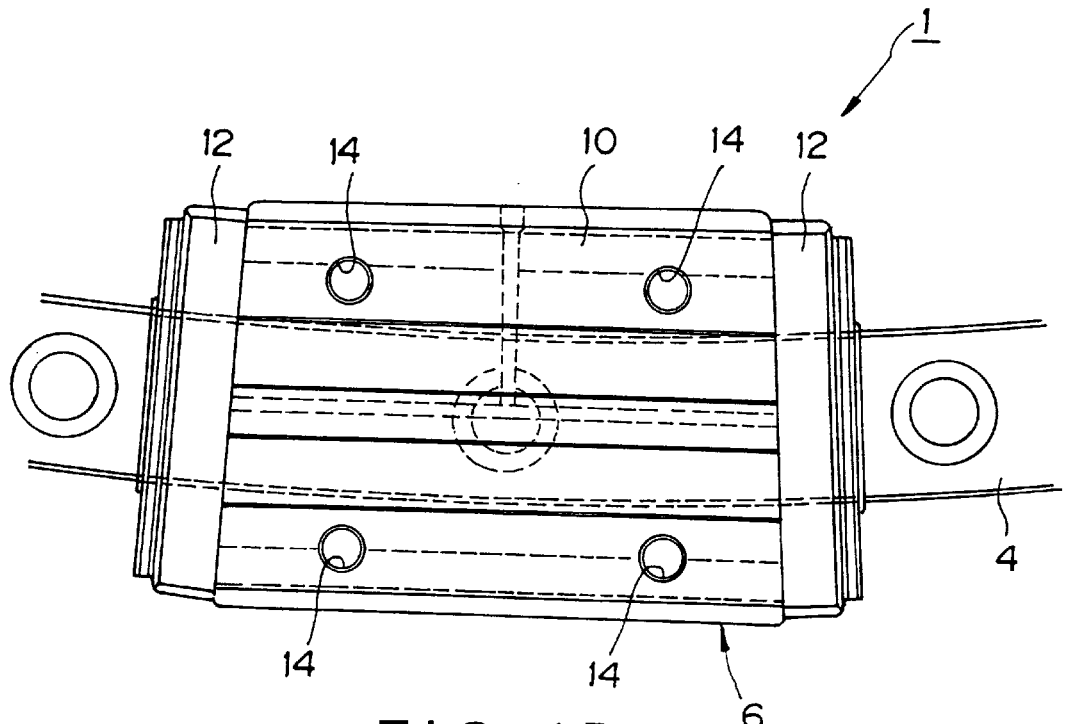

FIGS. 1 and 2 represent one embodiment of the present invention, and this embodiment will be preferably described hereunder with reference to an example of a rolling guide unit for guiding on a curved line a pendulum type vehicle such as railway rolling stock such as shown in FIGS. 3 and 4.

As shown in FIGS. 3 and 4, the rolling guide unit 1 is one usable for the curve guide for a vehicle body such as railway rolling stock, and a pair of such rolling guide units 1, 1 are oppositely arranged for supporting the vehicle body 3 swingably on a bogie 2. Each of the rolling guide unit 1 comprises as shown in FIGS. 1 and 2, a guide rail 4 and a movable member 6 assembled with the guide rail 4 so that the movable member 6 is movable along the guide rail 4 through rolling members 5 having a spherical outer shape such as balls.

The guide rail 4 has, as shown in FIG. 2A, rectangular section and is bent in an arcuate shape so as to provide a predetermined radius of curvature. The guide rail 4 has upper and lower (as viewed) side surfaces to which ball rolling grooves 7 are formed entirely therealong. The ball rolling grooves 7 are formed in three rows in the illustrated example on the upper and lower sides as shown in FIG. 2A. One row, two rows or more than three rows of the ball rolling grooves may be formed. The invention is not limited to the illustrated three-row arrangement.

Each of the ball rolling grooves 7 has an arcuate cross section having a radius of curvature larger than that of the ball 5 and has a depth of about ¼ to ½ of the diameter of the ball 5.

The movable member 6 is formed of a block member provided with a pair of supporting portions 61 and 62 which extend sideway substantially perpendicularly from a central portion thereof so as to entirely provide a ⊐-shaped cross section, and as shown in FIG. 2A, the movable member 6 is assembled with the guide rail 4 so that the supporting portions 61 and 62 are positioned on both the upper and lower sides of the guide rail 4 to be movable therealong. Each of the supporting portions 61 and 62 are formed with ball rolling grooves 8 corresponding to the ball rolling grooves 7 formed to the guide rail 4 in their positions and numbers. Each of the ball rolling grooves 8 also has an arcuate cross section having a radius of curvature larger than that of the ball 5 and has a depth of about ¼ to ½ of the diameter of the ball 5.

Figure 1B:
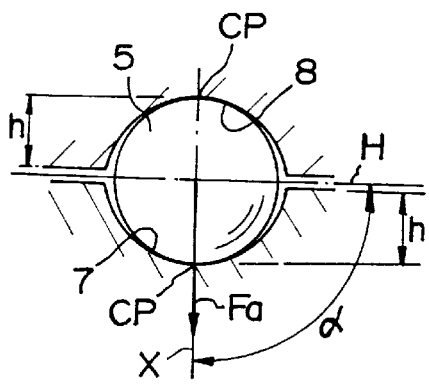
FIG. 1B is a view showing a contacting condition of a ball to a ball rolling groove of FIG. 1A in an enlarged scale.
Figure 1C:
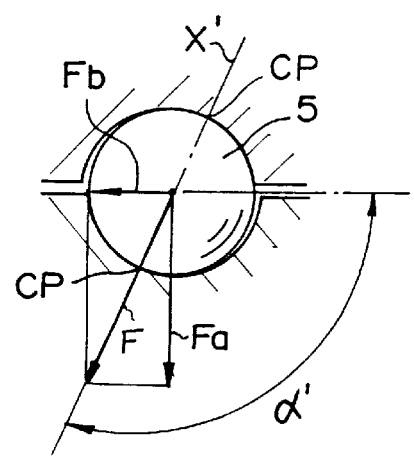
FIG. 1C is a view similar to FIG. 1B at a time when loads are applied to the ball in both horizontal and vertical directions as viewed.

When assembled, the balls 5 are disposed between these ball rolling grooves 7 and 8 each so as to contact at two points CP, in FIG. 1B or 1C, near groove bottoms thereof, and an angle $\alpha$ constituted by a line connecting these two contact points CP and a virtual horizontal line is set to approximately 90°. Accordingly, the contact points CP of the ball 5 is bilaterally displaceable with the position of contact angle $\alpha$ of 90° being the center of this displacement.

As shown in FIG. 2B, the movable member 6 comprises a main body 10 of the movable member 6, having the supporting portions 61 and 62, and side covers 12 mounted to front and rear end portions of the main body 10. The movable member main body 10 is provided with return passages 9 in an unloaded region for circulating the balls 5 in addition to the ball rolling grooves 8, 8, and each of the side covers 12 is formed with a ball turning passage 11 for changing the ball rolling direction.

The left side, as viewed in FIG. 1A, surface of the movable member 6 is formed as a mounting surface 13 to which tap holes 14 for fixing bolts 13 are formed. The right side, as viewed in FIG. 1A, surface of the guide rail 4 is formed as a mounting surface 16 which is fixed by means of bolts, not shown. Seal members 15 are disposed to the gaps between the inside surfaces of the upper and lower supporting portions 61 and 62 of the movable member 6 and the upper and lower side surfaces of the guide rail 4, and retainers 24 for holding the balls 5 are also disposed between these gaps as shown in FIG. 2C.

Preload is applied to the balls 5 by a suitable means.

In the rolling guide unit of the structure described above, load Fa applied in a vertical direction, as viewed in FIG. 1C, is born by three row of balls 5 having the initial contact angle of 90°. On the other hand, when a load Fb from the horizontal direction is born by the balls 5 having the displaced contact angle of $\alpha'$ at which the line X' connecting the contact points CP of the balls 5 to the ball rolling grooves 7 and 8 substantially accords with a direction of composite vector F of the vertical load Fa and the horizontal load Fb. In the thus manner, the vertical and horizontal loads are applied to the balls 5 at the displaced contact angle $\alpha'$.

In this embodiment, since the ball rolling grooves 7 and 8 are formed so as to provide the arcuate cross sections and the ball contact angle $\alpha$ is set to approximately 90°, variation of allowable load is small even if the contact angle $\alpha$ be changed.

That is, the allowable load will be expressed as follows.

$Co = f(Da \cdot z \cdot i \cdot \sin \alpha)$

Da: diameter of ball z: number of balls i: number of ball rows $\alpha$: contact angle (90° in the perpendicular case)

Figure 5A:
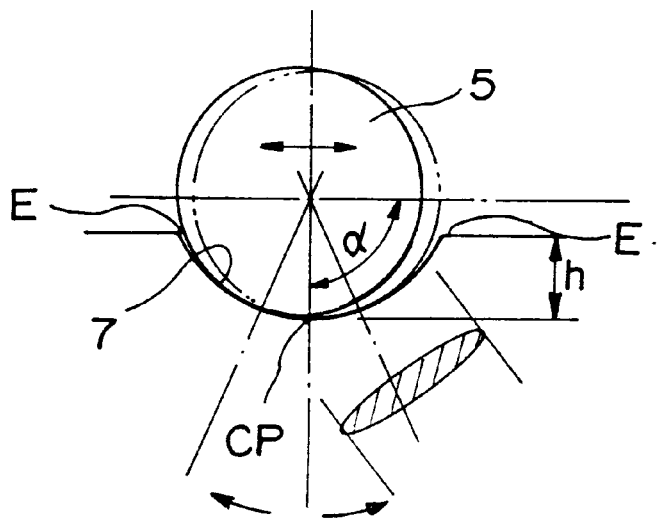
FIG. 5A is a view showing a condition of movement of a contacting point of the ball to the ball rolling groove.
Figure 5B:
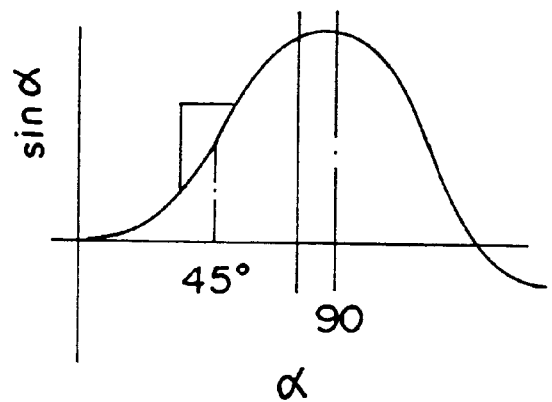
FIG. 5B is a sine function graph with the contact angle of the ball being variable.
Figure 5C:
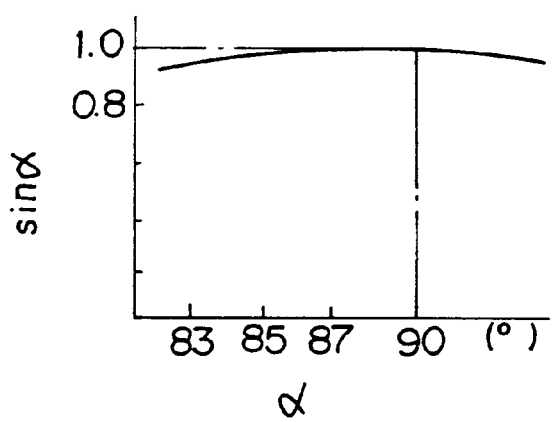
FIG. 5C is a view in an enlarged scale at a point near the contact angle of 90° in FIG. 5B.

As shown in FIG. 5B, the allowable load is expressed as sine function. A sine curve varies gently, as shown in FIG. 5C, at a portion near 90°, and the sine function value is 1 at the contact angle α of 90°; 0.998 of 87°; 0.996 of 85°; and 0.992 even of 83°. This means that even if the contact angle varies in the range of 90°±7°, the reduction ratio of the allowable load is less than 1%, being very small, and of course, the displacement of the allowable contact angle can be properly selected.

In addition, since the depth h of the ball rolling grooves 7 and 8 are made deep as mentioned hereinbefore, the ball 5 does not contact the edge E of the ball rolling groove 7 as shown in FIG. 5A even if the contact points CP are displaced, thus preventing the edge load from occurring. The depth h of the groove is determined in consideration of the edge load, but it is preferred to set the depth h to approximately ¼ to ½ oil the diameter of the ball 5.

The misalignment absorbed according to the present invention basically corresponds to displacement of the guide rail and the movable member in the horizontal direction, and it is possible to absorb the following misalignments as shown in FIG. 6: (1) a misalignment in the rotating direction about the central axis of the guide rail 4 (MC direction in FIG. 6A); a misalignment in the rotating direction reversely changing the front and rear end portions of the movable member 6 (MA direction in FIG. 6C); and a misalignment in the direction displacing the movable member 6 in the horizontal direction (Z direction in FIG. 6B).

The above misalignments are caused by, for example, a working error of the mounting surface of the movable member 6 as shown in FIG. 3 and an error caused by an angular error θ or dimensional error Δ in the horizontal direction. In addition, an error in degree of parallelism of the bilateral guide rails 4, 4 and an excessive clamping of the fastening bolt may also cause the misalignments.

FIGS. 6D to 6H represent the change of the contact angles in the absorption of the misalignments. FIG. 6D represents a position at which the initial contact angle α of 90° being the reference value preliminarily set, FIGS. 6E and 6F represent a position at which the misalignment in the MC direction is absorbed and the contact angle is displaced in a direction reverse to the rotating direction, and FIGS. 6G and 6H represent a position at which the misalignment in the Z direction is absorbed and the contact angle is displaced in a direction reverse to the first displaced direction.

In the meantime, when the misalignment in the MC direction is absorbed, the front and rear end portions of the movable member 6 are displaced in the horizontal direction reverse to each other, and the contact angle of the ball 5 positioned at the front and rear end portions of the movable member 6 are displaced in directions reverse to each other as shown in FIGS. 6G and 6H.

As discussed above, since the contact angle is initially set to approximately 90°, it is not necessary as in the conventional technology for the guide rail to be formed with complicated structure having a projection, and since the ball rolling groove 7 can be ground by a horizontal grinding technique, the guide rail can be easily manufactured. In the case where a plurality of ball rolling grooves 7 are formed, they can be formed with high performance of a pitch between adjacent ones. Furthermore, since the grinding allowance is constant along the entire length of the guide rail 4 and hence is easily measured, the ball rolling grooves 7 can be worked so as to provide a smooth finishing surface with high performance.

Particularly, when the guide rail 4 is formed to provide a curved line shape, since it is not necessary to form the guide rail with the projected rib 107, and the guide rail is formed so as to provide a simple rectangular shape, a plastical deformation in a bending working can uniformly progress with substantially no camber, thus being easily manufactured, and accordingly, the grinding allowance in the finishing working can be minimally suppressed, thus being effective in production.

FIG. 7 represents other embodiments of the present invention.

Figure 7A:
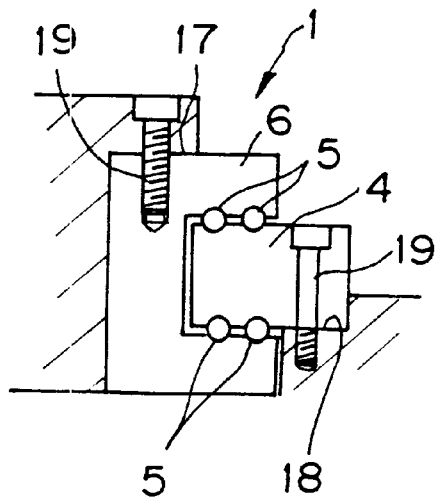
FIG. 7 includes FIGS. 7A to 7C representing structures of other embodiments of the rolling guide unit according to the present invention.
Figure 7B:
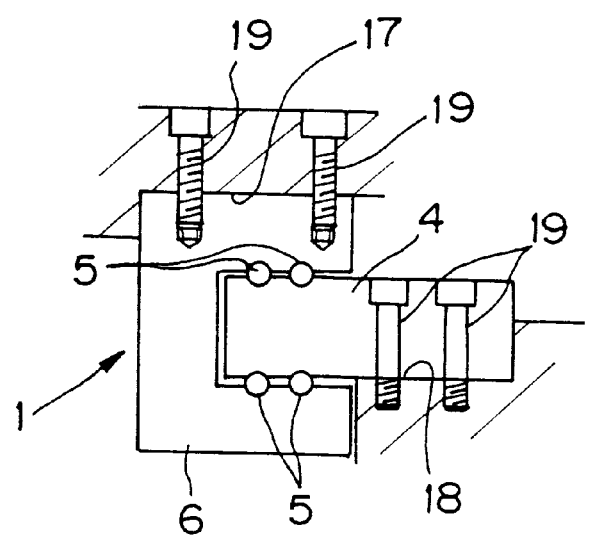
Figure 7C:
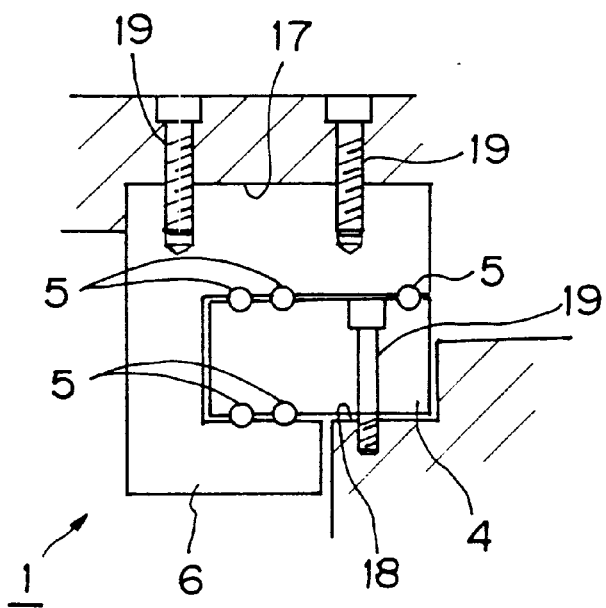

FIG. 7A shows an embodiment, in which the upper end surface 17 of the movable member 6 and the lower end surface 18 of the guide rail 4 are formed as mounting surfaces of the movable member 6 and the guide rail 4, respectively, and these members are fastened each by means of single fixing bolt 19 in the vertical direction as viewed. In the structure of FIG. 7B, two fixing bolts 19 are utilized respectively for the movable member 6 and the guide rail 4, respectively. In the embodiment of FIG. 7C, two fixing bolts 19 are utilized for the movable member 6 and single fixing bolt 19 is utilized for the guide rail 4. The numbers of rows of the balls 5 are different between the upper side surface and the lower side surface of the guide rail, and in the illustrated embodiment, three ball rows are formed on the upper side surface of the guide rail 4 and two ball rows are formed on the lower side surface thereof.

FIG. 8 represents a further embodiment of the present invention, which has a basic structure essentially identical to that of the embodiment shown in FIG. 1 and only has a different point that the balls rolling along the central ball rolling groove 7 in FIG. 1 are substituted with cylindrical rollers 20 rolling along a rolling groove 21.

In accordance with this structural difference, the roller rolling groove 21 for the rollers 20 formed to the inside surfaces of the supporting portions 61 and 62 of the movable member 6 is formed so as to provide a rectangular cross section so as to accord with the shape or the cylindrical roller 20. The bottom of the groove 21 is made flat accordingly. On the other hand, any roller rolling groove for the rollers 20 is not formed to the upper and lower side surfaces of the guide rail 4 and the upper and lower surfaces thereof are directly utilized for the roller rolling surface as they are.

According to this structure of the embodiment of FIG. 8, the rollers 20 can move in the horizontal direction along the upper and lower side surfaces of the guide rail 4, and hence, the misalignment in the horizontal direction can be absorbed by the embodiment of FIG. 1. In addition, according to this embodiment of FIG. 8, a larger load in the vertical direction can be born in comparison with the structure of the embodiment of FIG. 1, thus being more advantageous.

Furthermore, the misalignments in the horizontal (Z) direction and the MA direction of the kind shown in FIGS. 6B and 6C can be absorbed in the same manner as described with reference to the embodiment of FIG. 1, and the misalignment in the MC direction shown in FIG. 6A does not constitutes a problem since the rollers 20 are positioned at the central portion of the guide rail side surface and the displacement of the roller 20 is hence small in comparison with the bilateral side ones.

Figure 8A:
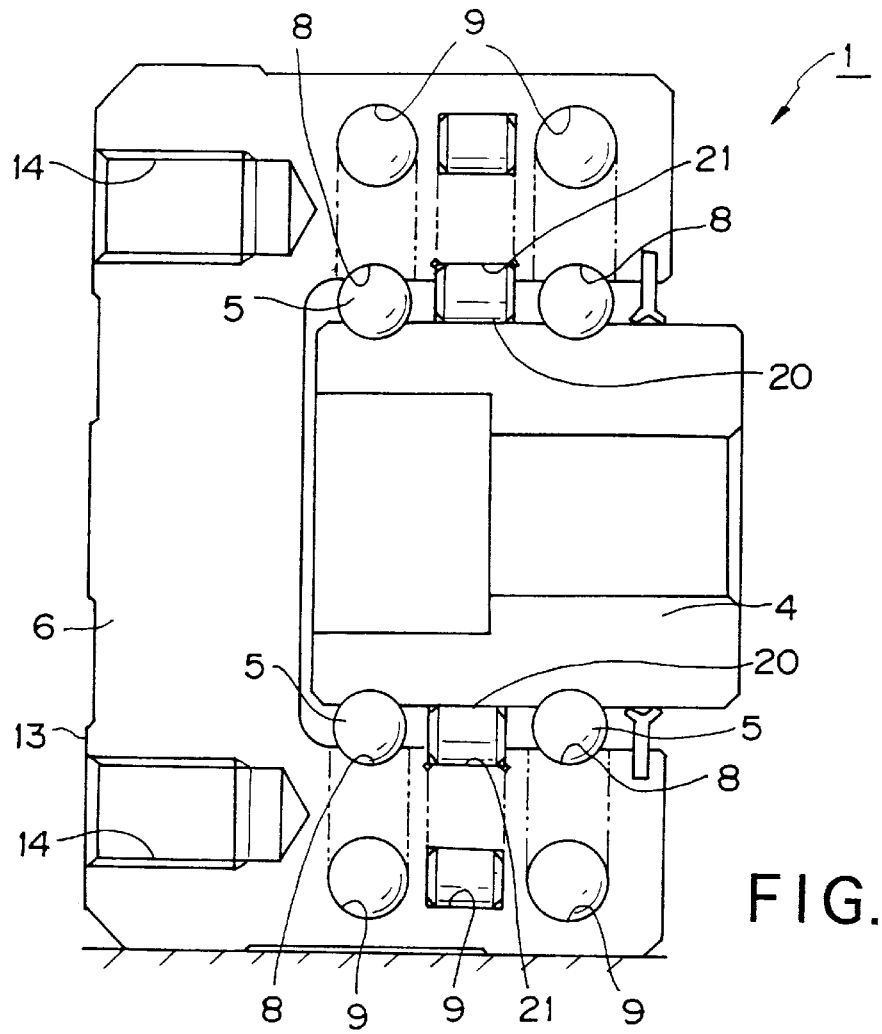
Figure 8B:
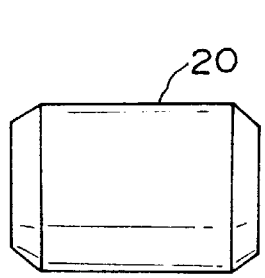
Figure 8C:
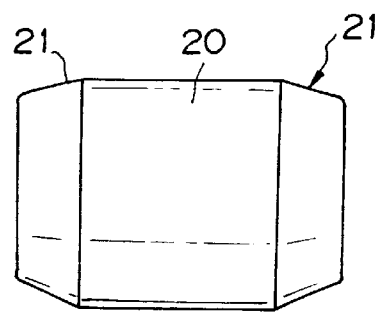
Figure 8D:
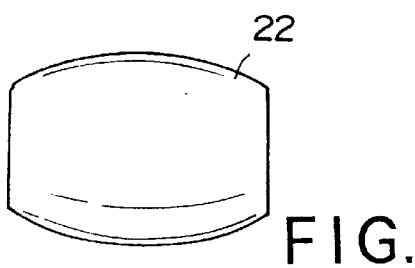

However, since there may be a slight fear of causing the edge load at the end portion of the roller 20, a crowning treatment will be effected to the edge portion 21 as shown in FIG. 8C, or barrel shaped roller having a central portion swelled in section such as shown in FIG. 8D may be utilized, as occasion demands. In the case where the barrel shaped rollers 20 are utilized, it: is necessary to form the roller rolling groove so as to provide an arcuate cross section having a radius of curvature larger than that of the barrel roller 20.

Figure 8E:
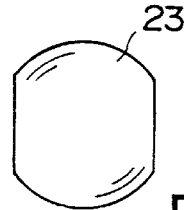

In a modification, the barrel shaped rollers 20 or spherical, partially cut away, rollers 23 shown in FIG. 8E may be utilized in substitution for the ball rollers 5.

Figure 9A:
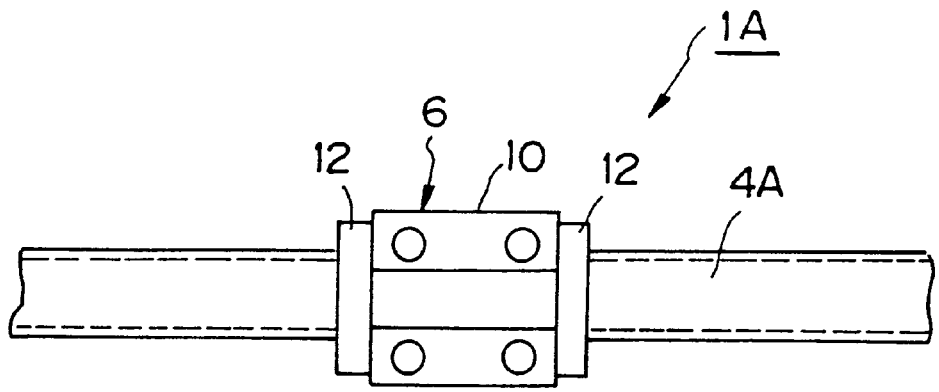
FIG. 9A is a side view of the linear guide type rolling guide unit and FIG. 9B is a perspective view of a guide rail to which the guide unit of FIG. 9A is mountable.
Figure 9B:
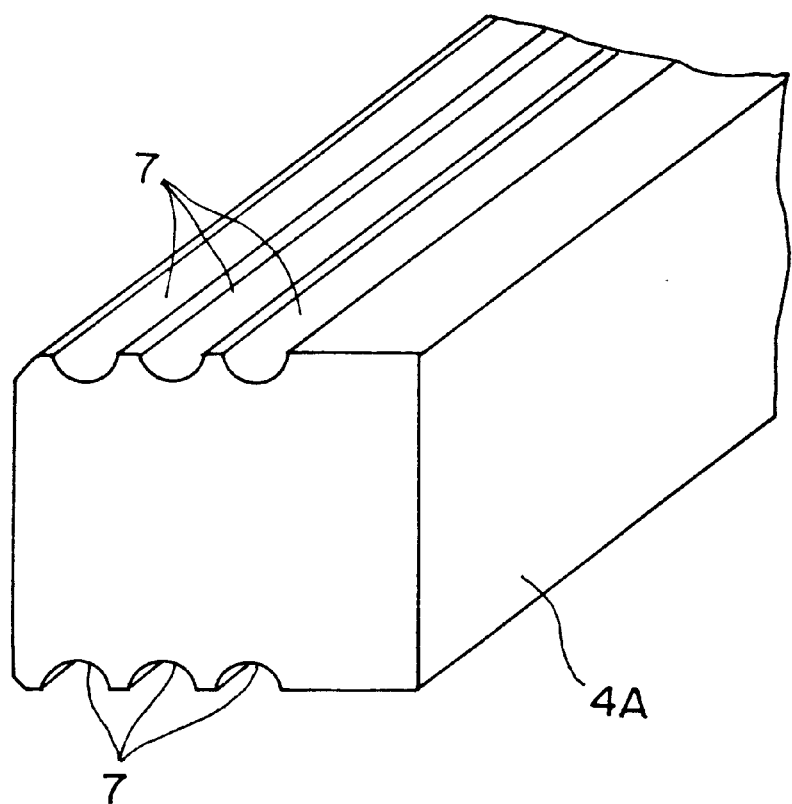

In the forgoing description, the embodiments of the curved line guiding structure were provided, the present invention is not limited to such curved line guiding structure and it can be applied as it is to the rolling guide units 1A for the linear guiding structure as shown in FIG. 9. That is, in comparison with the curved line guiding structure, the curved guide rail 4 is constructed to a linear guide rail 4A and the respective ball rolling grooves are formed linearly so as to accord with the linear guide rail 4A, and the other structure is the same as that of the former embodiment.

Figure 10:
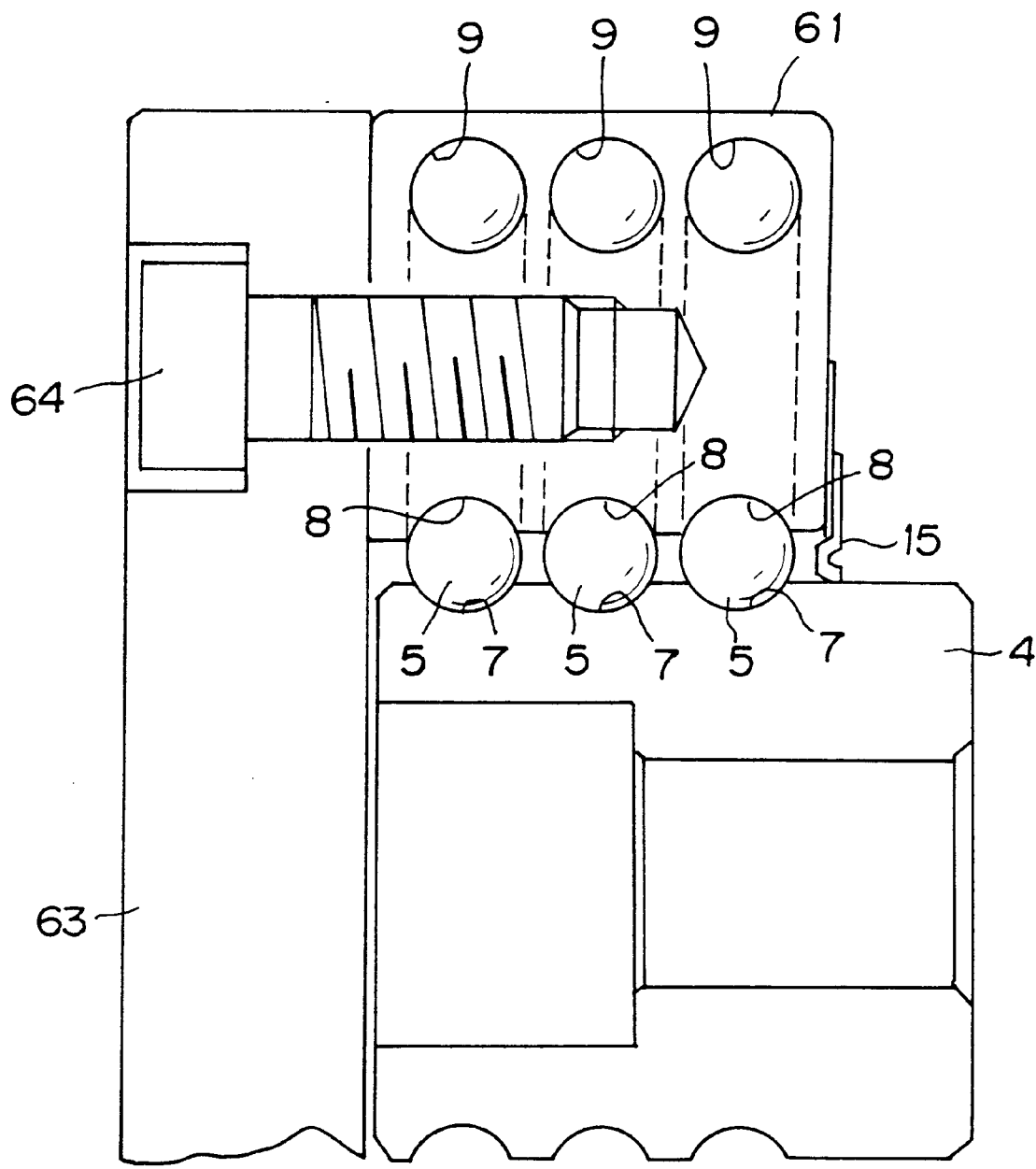
FIG. 10 is a sectional view of a partial portion of another embodiment of the rolling guide unit in which a support structure is constructed as a separate member.

Furthermore, in the first described embodiment, the supporting portions 61 and 62 are formed integrally to the central portion of the movable member 6, but these portions may be independently formed as shown in FIG. 10, for example. That is, the supporting portion 61 is fixed to the main body 63 (FIG. 10) of the movable member 6 by a fastening means 64 such as bolt. Both these portions or either one of these portions may be independently formed from the main body 63 of the movable member 6.

In the present invention, the horizontal gap is formed between the ball and the ball rolling grooves for absorbing the misalignment of the ball. However, this gap may be eliminated by applying a horizontal preload, and in such arrangement, the horizontal supporting rigidity will be increased.

FIG. 11 shows an example increasing the horizontal supporting rigidity.

Referring to the example of FIG. 11, a movable table 31 is movably supported by a fixed table 30 through a pair of opposing rolling guide units 1, 1, and the movable table 31 is formed with skirt portions 32 and 33, as supporting portions, extending downward, as viewed, from both the bilateral ends thereof. The paired rolling guide units 1, 1 are mounted between the inner surfaces of the skirt portions 32 and 33 and the outer side surfaces of the fixed table 30.

Figure 11A:
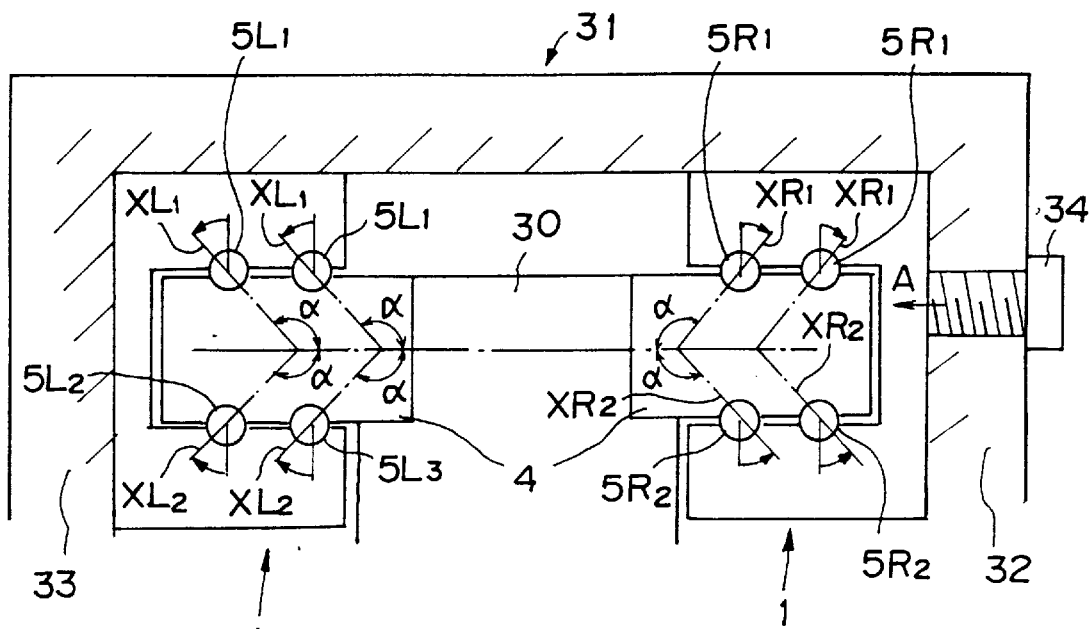
FIGS. 11A and 11B are schematic views showing the support structure of a movable member capable of increasing supporting rigidity both in the horizontal and vertical directions by utilizing the rolling guide unit according to the present invention.
Figure 11B:
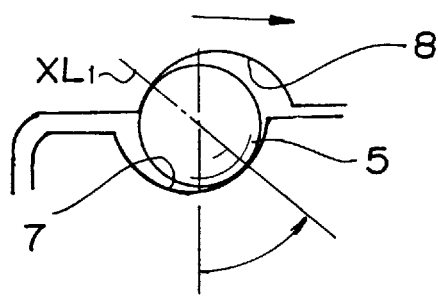

In order to apply a preload to the structure shown in FIG. 11A, in one example, a preload adjusting bolt 34 may be screwed to one of the skirt portion 32, for example, thereby to push the side surface of one of the rolling guide unit 1 against the guide rail di fixed to the fixed table 30, whereby the horizontal gap between the balls 5 and the ball rolling grooves 7 and 8 is eliminated, thus applying the horizontal preload in a state shown in FIG. 11B. In a modification, a tapered wedge member, for example, not shown, may be inserted forcibly into the gap between the facing surfaces of the skirt portion 32 and the movable member 6 of the rolling guide unit 1, thus also applying the horizontal preload.

That is, when one of the movable members 6 of the rolling guide unit 1 is pressed through one 32 of the skirt portions of the movable table 31 by, for example, the preload adjusting bolt 34, a reaction force of the pressing force is transferred to the other one 33 of the skirt portions through the movable table 31, and then, the other movable member 6 of the other rolling guiding unit 1 is pressed against the guide rail 4 fixed to the fixed table 30 through the other skirt portion 33. Through this preload applying process, in the illustration of FIG. 11A, the contact angles α of the upper and lower balls in the right rolling guide unit 1 are displaced such that the upper ball 5R1 is rotated clockwisely from the initial contact angle 90° position and the lower ball 5R2 is rotated counterclockwisely therefrom. On the other hand, the contact angles α of the upper and lower balls in the left rolling guide unit 1 are also displaced such that the upper ball 5L1 is rotated counterclockwisely from the initial contact angle 90° position and the lower ball 5L2 is rotated clockwisely therefrom. In the thus manner, the horizontal gap between the respective balls 5 can be eliminated.

In the assumption that lines connecting the contact points of the respective balls 5R1, 5R2 5L1 and 5L2 and the ball rolling grooves 7 and 8 into which theses balls disposed constitute contact angle lines XR1, XR2, XL1 and XL2, upper and lower these contact angle lines in the right and left rolling guide units 1, 1 are inclined outward of the guide units as shown in FIG. 11A.

According to the arrangement of the ball contact angles, the supporting rigidity in the vertical direction can be improved as well as that in the horizontal direction.

Therefore, according to the rolling guide unit of the present invention, the supporting structure having improved load bearing performance in the vertical and horizontal directions, i.e. every direction, can be realized as well as achieving the misalignment absorbing performance.

FIGS. 12 to 21 represent various examples each having such a contact angle structure as mentioned above of a plurality of ball rows, typically through examples of the upper and lower three ball rows.

Figure 12:
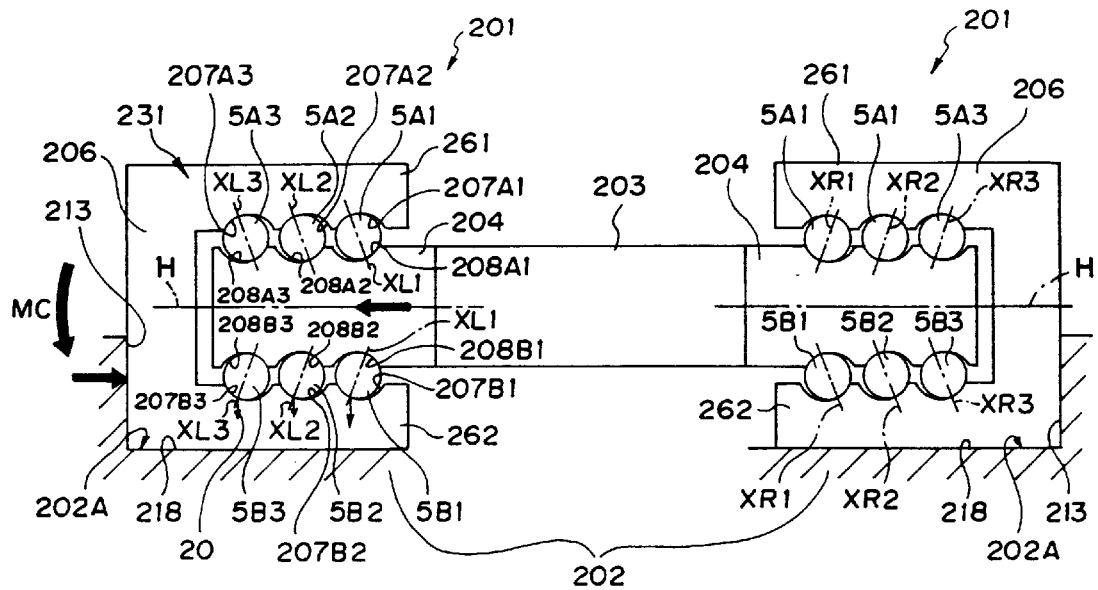
FIG. 12 is a schematic view of the rolling guide unit representing one example of a tandem contact structure.

FIG. 12 shows an example of tandeim type, which has the respective upper and lower three rows, total six rows, of balls and the contact angles in the same directions as in the example of FIG. 11.

That is, as like in FIG. 3, a vehicle body 203 is movably supported by a bogie 202 through a pair of rolling guide units 201, 201. The paired rolling guide units 201, 201 have guide rails 204, 204 opposing to each other on the inner side, vehicle body side, thereof and movable members 206, 206 opposing to each other on the outer side thereof such that the inner side surfaces of the guide rails 204, 204 are fixed to the mounting surface of the vehicle body 203 and the outer side surfaces and the lower surfaces of the movable members 206, 206 are fixed to stepped mounting portions 202A, 202A formed to the bogie 202.

Each of the stepped portions 202A, 202A has an L-shaped cross section having a horizontal mounting surface 218 to which the lower side surface of the movable member 206 is fixed and a perpendicular mounting surface 213 to which the outer side surface of the movable member 206 is fixed.

Each of the movable members 206, 206 has substantially a ⊐-shaped cross section having a pair of upper and lower supporting portions 261 and 262 extending in a horizontal direction as viewed in FIG. 12, and each of the guide rails 204, 204 having substantially rectangular cross section is fitted into a ⊐-shaped recessed portion of the corresponding movable member 206 from the horizontal direction.

The balls as rolling members in respectively three rows are rollably disposed between the facing surfaces of the upper and lower supporting portions 261 and 262 and the guide rails 204, 204. Supposing that the upper and lower respectively three rows of balls are referred to as upper first, second and third balls 5A1, 5A2 and 5A3 and lower first, second and third balls 5B1, 5B2 and 5B3 from the inner side to the outer side as in the illustration of FIG. 12, these upper and lower balls have the same diameters and are arranged linearly symmetrically respectively with respect to a horizontal axis H passing the center of the guide rails 204, 204.

The upper first, second and third balls 5A1, 5A2 and 5A3 and the lower first, second and third balls 5B1, 5B2 and 5B3 are rollably disposed between upper first, second and third ball rolling grooves 207A1, 208A1; 207A2, 208A2; 207A3, 208A3, and the lower first, second and third ball rolling grooves 207B1, 208B1; 207B2, 208B2; 207B3, 208B3 of the upper and lower supporting portions 261, 262 of the movable member 206 and the corresponding upper and lower side surfaces of the guide rails 204.

In such example of tandem type structure, the upper first, second and third ball rolling grooves 207A1, 208A1; 207A2, 208A2; 207A3, 208A3 formed to the upper supporting portion 261 and the upper side surface of the guide rail 204 are formed so as to provide the same phases and pitches as those of the lower first, second and third ball rolling grooves 207B1, 208B1; 207B2, 208B2; 207B3, 208B3 formed to the lower supporting portion 262 and the lower side surface of the guide rail 204. In a free arrangement of the balls, the initial contact angles of the upper first, second and third balls 5A1, 5A2 and 5A3 and lower first, second and third balls 5B1, 5B2 and 5B3 are made to substantially 90°.

In the illustrated example, the outer side surface of the movable member 206 of one of the rolling guide units 201 is pressed against the guide rail 204 mounted to the vehicle body side by means of a preload adjusting bolt such as shown in FIG. 6 or by using a tapered wedge member thereby to eliminate the horizontal gap between the balls 5A1—, 5B1—and the ball rolling grooves 207A1, 208A1; 207B1, 208B1—, whereby a horizontal preload is applied, thereby inclining the balls by a predetermined angle with respect to the initial contact angle 90° to the ball rolling grooves.

That is, the ball contact angles α of the upper first, second and third balls 5A1, 5A2 and 5A3 of the right side rolling guide unit 201 are displaced clockwisely in the illustration from the initial contact angle 90°, and the ball contact angles α of the lower first, second and third balls 5B1, 5B2 and 5B3 of the right side rolling guide unit 201 are displaced counterclockwisely in the illustration from the initial contact angle 90°. On the contrary, with respect to the upper and lower balls 5 of the left side rolling guide unit 201, the contact angles have linear symmetric arrangement with respect to the central perpendicular line between the right and left side rolling guide units 201, 201, and the contact angles of the upper first, second and third balls 5A1, 5A2 and 5A3 are displaced in the counterclockwisely in the illustration and the contact angles of the lower first, second and third balls 5B1, 5B2 and 5B3 are displaced clockwisely. In thus manner, the horizontal gaps of the respective balls can be eliminated, and the contact angle lines XR1, XR2, XR3 and XL1, XL2, XL3 of the upper and lower balls of the right and left side rolling guide units 201 are inclined to be opened outward.

As described above, the example of FIG. 12 represents the tandem type structure which has the respectively upper and lower three rows, total six rows, of balls having the contact angles in the same direction. In a modified example, as shown in FIG. 13, the inclination of the contact angle lines may be set in directions reverse to those of FIG. 12.

Figure 13:
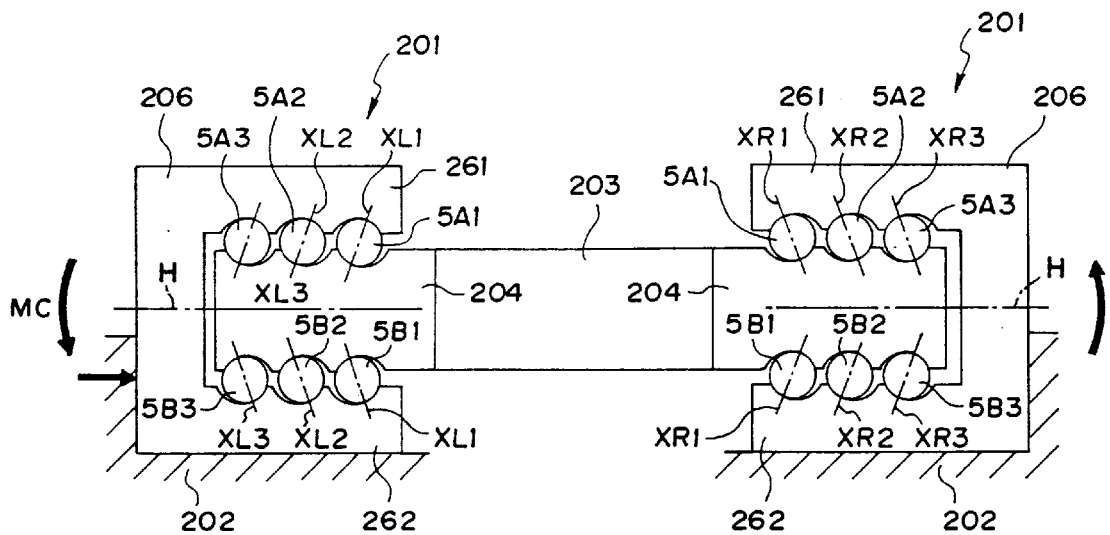
FIG. 13 is a schematic view, similar to that of FIG. 12, representing another example of the tandem contact structure.

That is, referring to FIG. 13, the contact angle lines XR1, XR2, XR3 and XL1, XL2, XL3 of the upper and lower balls of the right and left side rolling guide units 201 are inclined to be opened inward. A structure having such contact angle arrangement will be easily realized by applying a force in the direction to outwardly draw out the movable member from the guide rail 204.

The basic structure of such tandem type example is identical to that shown in FIG. 6 in which the single row of balls are disposed at each of upper and lower sides, and accordingly, a moment load caused by the mounting error and eccentric load are not born, so that any inner load is not caused by such moment, thus being advantageous. That is, when the moment load MC acts, the movable member is moved in an inclined state in the direction of an arrow in FIG. 13.

Furthermore, according to this example, even in a case where the degree of parallelism between two axes of the respective guide rails are out of order, only the ball contact point varies and no forcible force acts on the balls, thus absorbing a geometric distortion of the parallelism between the axes of the guide rails.

Loads in the vertical and horizontal directions may be easily uniformly born.

According to the arrangement of the ball contact angles described above, the supporting rigidity in the horizontal direction can be improved as well as in the vertical direction. Accordingly, the rolling guide unit of these examples, the misalignment of the balls can be absorbed as well as realizing the support structure having high load bearing ability in the horizontal and vertical, i.e. every, directions in its use.

FIGS. 14 to 19 represent other examples of compound contact type structure in which the ball contact structure of respectively upper and lower three rows of balls is adapted such that at least one pair of balls of the upper or lower side rows have contact angles inclined reversely to each other. In such a compound contact type structure, the moment load caused by the mounting error or eccentric load can be born by one movable member.

As the basic structures of these examples are substantially identical to that of FIG. 12, the same reference numerals are added to members or portions corresponding to those of FIG. 12 and the descriptions thereof are omitted herein, and only the direction of the contact angle is referred to hereunder.

Elastic members 250 and 251 made of such as rubber material are interposed between the horizontal mounting surface 218 of the mounting stepped portion of the bogie and the lower side surface of the movable member 206, that is, between the perpendicular mounting surface 213 and the outer side surface of the movable member 206 for the purpose of absorbing the mounting error or the like. Of course, these mounting surfaces may be directly secured without interposing such elastic members 250 and 251.

Figure 14:
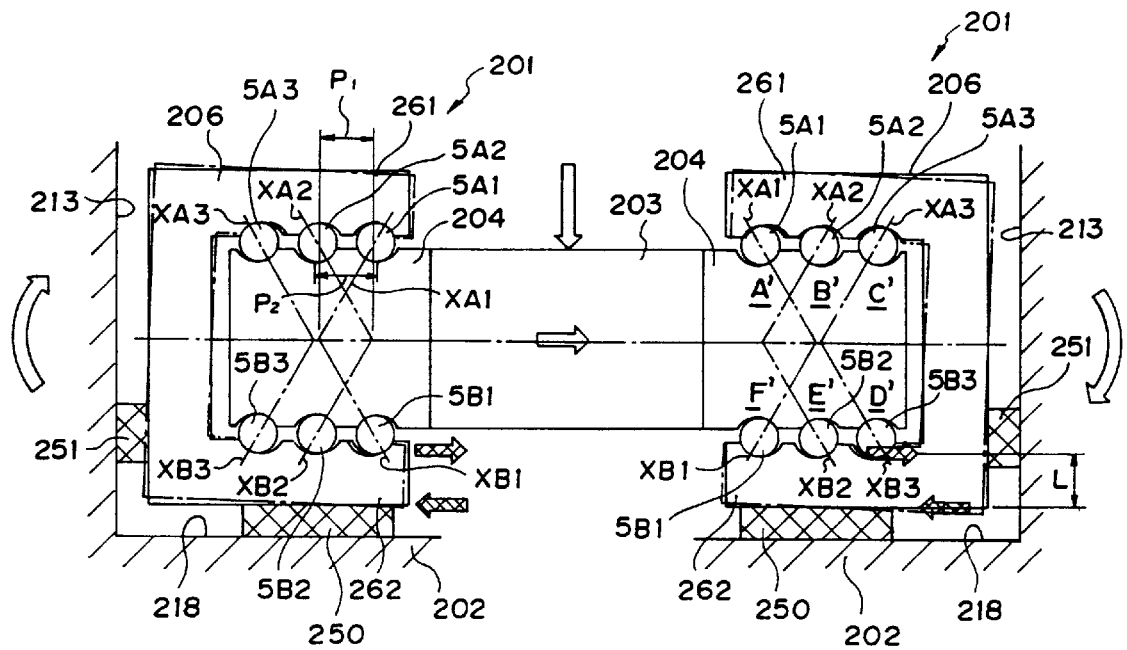
FIG. 14 is a schematic view of the rolling guide unit representing one example of a DF type compound contact structure.

In the example of FIG. 14, the contact angle lines are symmetrically inclined by predetermined angles with respect to the initial angle 90° so that the contact angle lines XA1 and XA2 of the upper first and second balls 5A1 and 5A2 are opened upward in the illustration and the contact angle lines XB1 and XB2 of the lower first and second balls 5B1 and 5B2 are opened downward. The contact angle line XA3 of the upper third ball 5A3 and the contact line XB3 of the lower third ball 5B3 are set in parallel to the contact angle lines XA2 and XB2 of the upper and lower second balls 5A2 and 5B2, respectively.

Such ball contact structure will be realized, for example, by setting a pitch P1 between the upper and lower first ball rolling grooves 207A1 and 207B1 and the upper and lower second ball rolling grooves 207A2 and 207B2 of the upper and lower supporting portions 261 and 262 to be smaller than a pitch P2 between the upper and lower first ball rolling grooves 208A1 and 208B1 and the upper and lower second ball rolling grooves 208A2 and 208B2 of the guide rails 204, and also setting a pitch between the upper and lower second ball rolling grooves 207A2 and 207B2 and the upper and lower third ball rolling grooves 207A3 and 207B3 of the upper and lower supporting portions 261 and 262 to be equal to a pitch between the upper and lower second ball rolling grooves 207A2 and 207B2 and the upper and lower third ball rolling grooves 207A3 and 207B3 of the guide rails 204.

As described above, by adopting the ball contact structure of a pair of angular contact arrangement, the gap can be adjusted and the initial contact angle is made stable at the time of assembling the guide rail 204 and the movable member 206.

Figure 15:
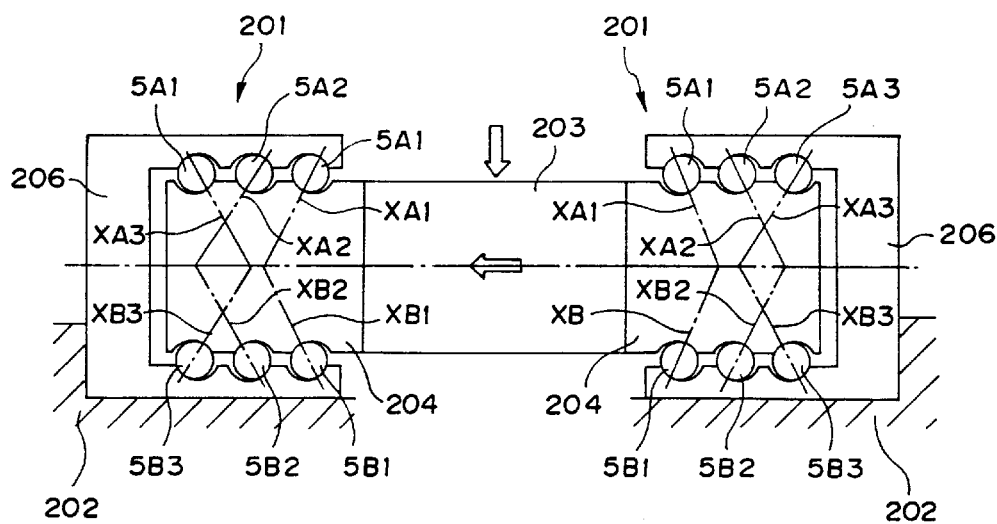
FIG. 15 is a schematic view representing another example of the DF type compound contact structure.

FIG. 15 shows an example in which an angle between the upper and lower contact angle lines are opened outward, in which an angle of the contact angle lines XA2 and XA3 of the upper second and third balls 5A2 and 5A3 and an angle of the contact angle lines XB2 and XB3 of the lower second and third balls 5B2 and 5B3 are opened outward.

Figure 16:
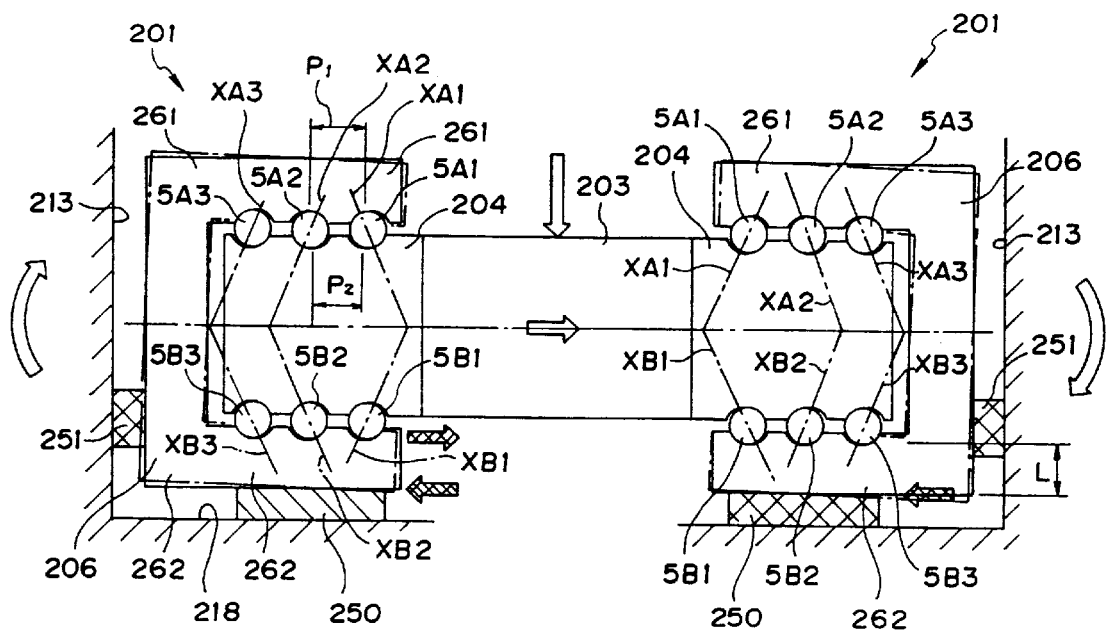
FIG. 16 is a schematic view of the rolling guide unit representing one example of a DB type compound contact structure.

In the example of FIG. 16, the contact angle lines are symmetrically inclined by predetermined angles with respect to the contact angle of 90° so that an angle between the contact angle line XA1 and XA2 of the upper first and second balls 5A1 and 5A2 is opened inward toward the inner guide rail 204, and an angle between the contact angle line XB1 and XB2 of the lower first and second balls 5B1 and 5B2 is opened inward toward the inner guide rail 204. On the other hand, the contact angle lines XA3 and XB3 of the upper and lower third balls 5A3 and 5B3 are set to be substantially parallel to the contact angle lines XA2 and XB2 of the upper and lower second balls 5A2 and 5B2, respectively.

Such ball contact structure will be realized, for example, by setting a pitch P1 between the upper and lower ball rolling grooves 207A1 and 207B1 and the lower second ball rolling grooves 207A2 and 207B2 of the upper and lower supporting portions 261 and 262 to be larger than a pitch P2 between the upper and lower first ball rolling grooves 208A1 and 208B1 and the upper and lower second ball rolling grooves 208A2 and 208B2 of the guide rails 204, and also setting a pitch between the upper and lower second ball rolling grooves 207A2 and 207B2 and the upper and lower third ball rolling grooves 207A3 and 207B3 of the upper and lower supporting portions 261 and 262 to be equal to a pitch between the upper and lower second ball rolling grooves 207A2 and 207B2 and the upper and lower third ball rolling grooves 207A3 and 207B3 of the guide rails 204.

Figure 17:
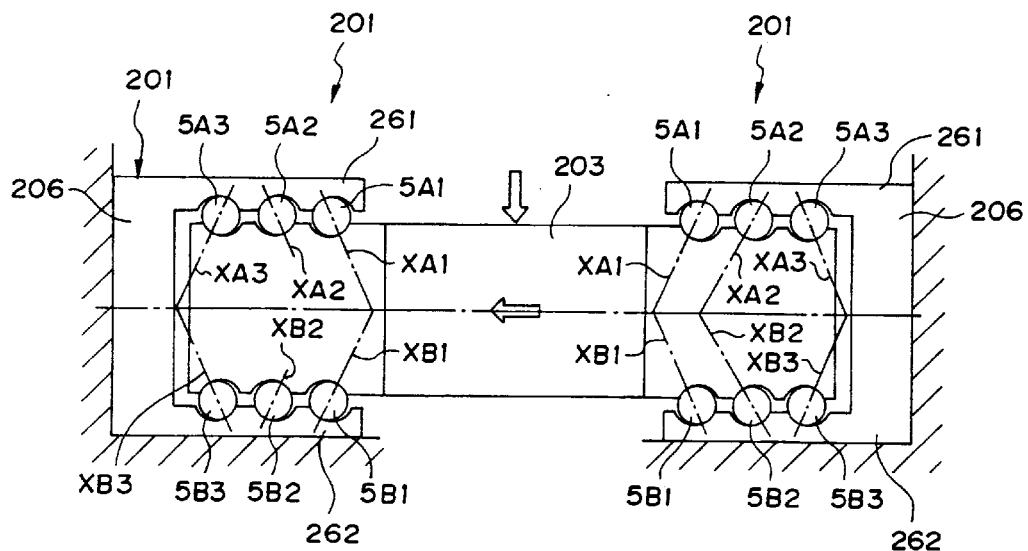
FIG. 17 is a schematic view representing another example of the DB type compound contact structure.

FIG. 17 shows an example in which an angle between the upper and lower contact angle lines are opened inward, in which an angle of the contact angle lines XA2 and XA3 of the upper second and third balls 5A2 and 5A3 and an angle of the contact angle lines XB2 and XB3 of the lower second and third balls 5B2 and 5B3 are opened inward.

Figure 18:
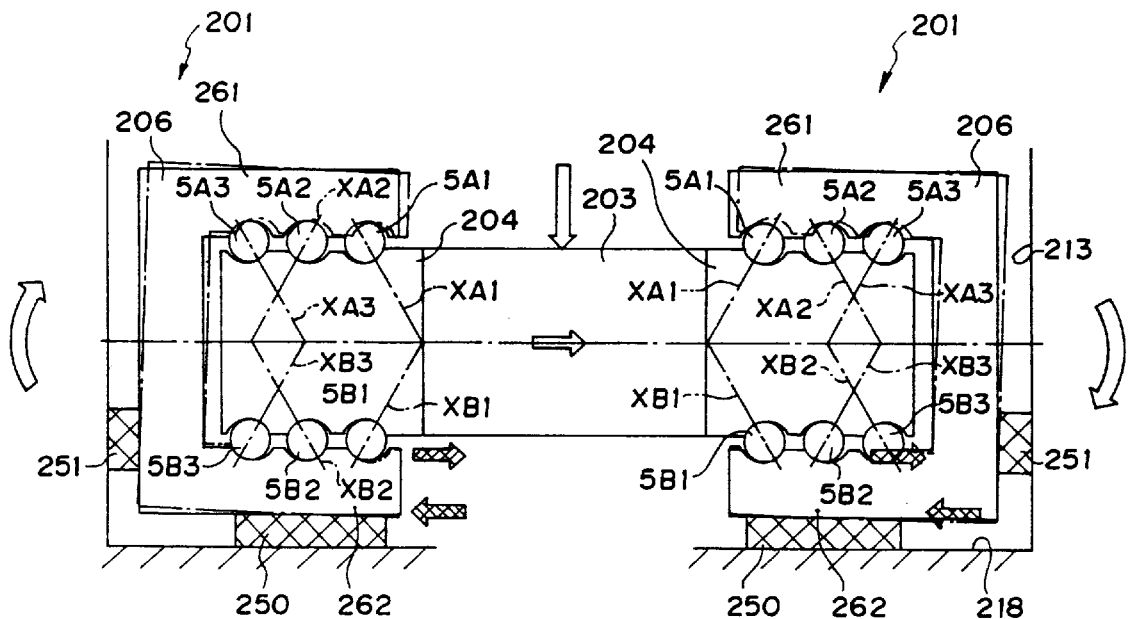
FIG. 18 is a schematic view of the rolling guide unit representing one example of a compound contact structure of both the DF type and DB type.
Figure 19:
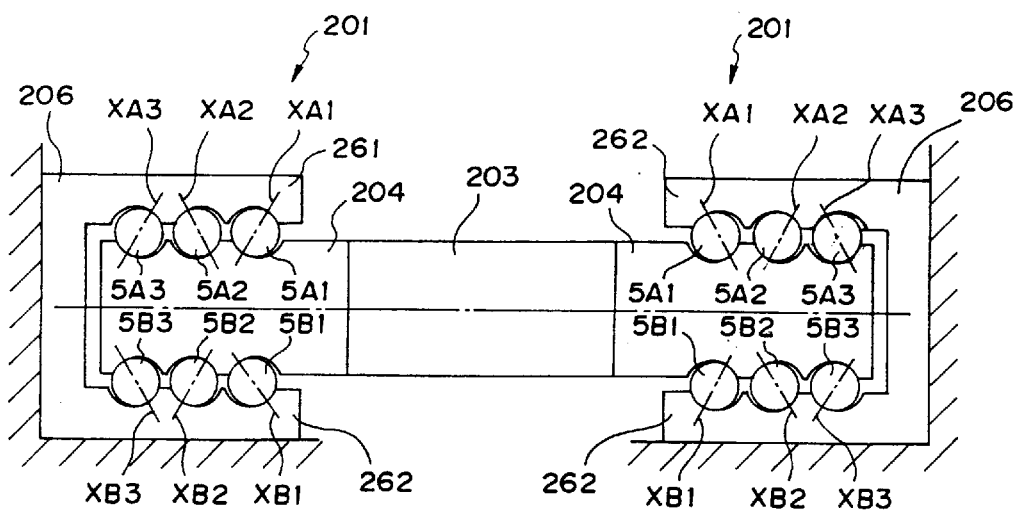
FIG. 19 is a schematic view representing another example of the compound contact structure of both the DF type and DB type.

Examples of FIGS. 18 and 19 shows an arrangement in which angles between respectively adjacent contact angle lines XA1, XA2, XA3, XB1, XB2 and XB3 are opened alternately outward and inward.

That is, FIG. 18 shows an example in which angles between the contact angle lines XA1 and XA2 of the upper first and second balls 5A1 and 5A2 and between the contact angle lines XB1 and XB2 of the lower first and second balls 5B1 and 5B2 are opened inward, and angles between the contact angle lines XA2 and XA3 of the upper second and third balls 5A2 and 5A3 and between the contact angle lines XB2 and XB3 of the lower second and third balls 5B2 and 5B3 are opened outward.

FIG. 19 shows an example in which angles between the contact angle lines XA1 and XA2 of the upper first and second balls 5A1 and 5A2 and between the contact angle lines XB1 and XB2 of the lower first and second balls 5B1 and 5B2 are opened outward, and angles between the contact angle lines XA2 and XA3 of the upper second and third balls 5A2 and 5A3 and between the contact angle lines XB2 and XB3 of the lower second and third balls 5B2 and 5B3 are opened inward.

Figure 20:
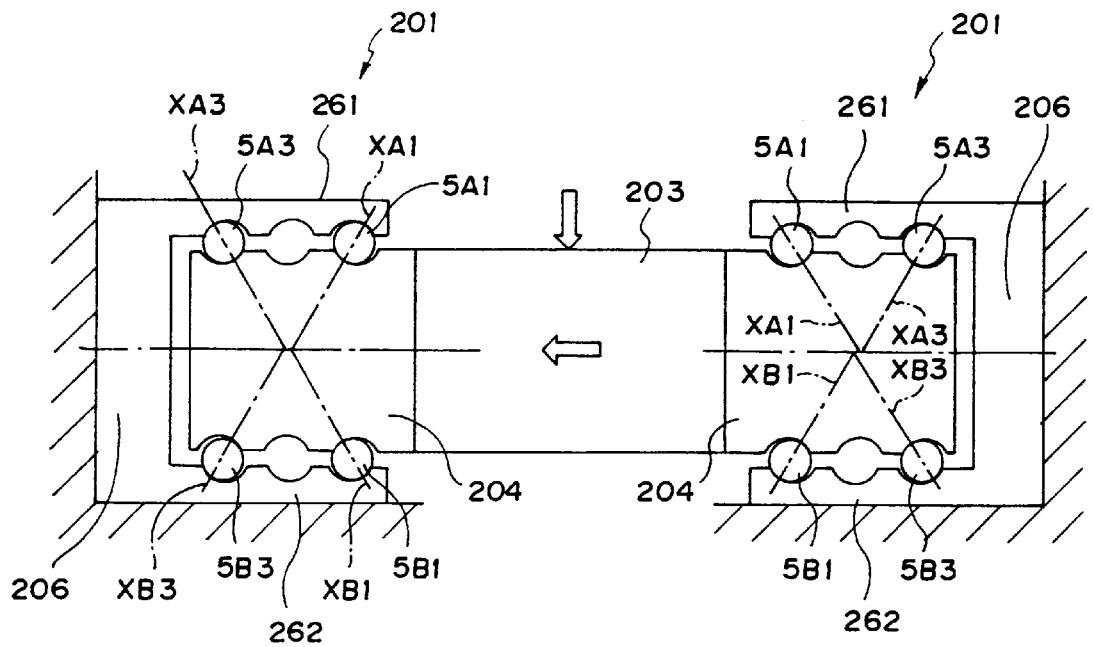
FIG. 20 is a schematic view showing a further example of the contact structure.

In these examples, the numbers of ball rows, the numbers of the balls in each ball row, and the ball diameter are optionally selected in accordance with a load to be applied. For example, regarding the numbers of the ball rows, as shown in FIG. 20, two ball rolling grooves corresponding to the upper and lower first and third balls 5A1, 5A3 and 5B1, 5B3.

Figure 21:
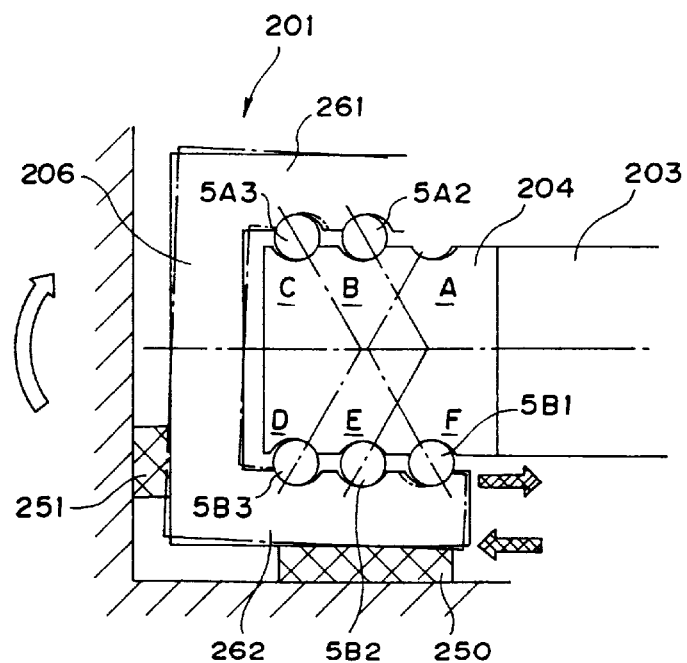
FIG. 21 is a schematic view showing a still further example of the contact structure.
Figure 22:
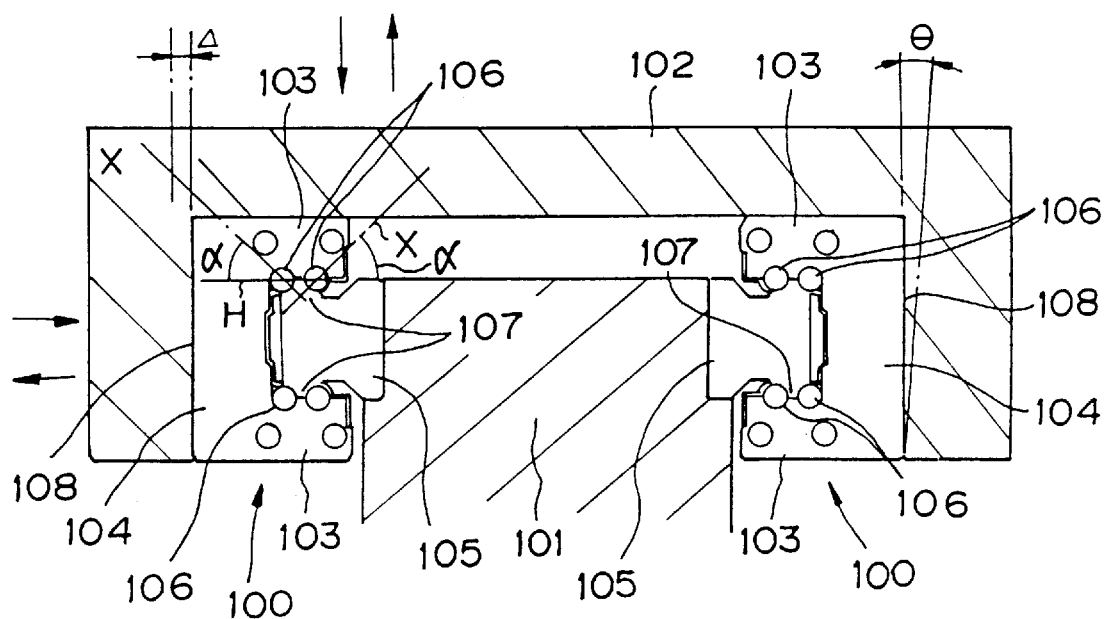
FIG. 22 is a cross sectional view of a table moving apparatus utilizing a rolling guide unit of conventional structure.

Furthermore, the contact structure of the respective balls of the upper and lower supporting portions 261 and 262 are made linearly symmetrical with respect to the horizontal axis, it is not always necessary to adapt the Linear symmetric structure, and as shown in FIG. 21, in accordance with the load to be applied, an arrangement different in ball rows may be adapted such that two rows of the second and third balls 5A2 and 5A3 are formed on the upper side and three rows of the first, second and third balls 5B1, 5B2 and 5B3 are formed on the lower side.

Further, it is to be noted that, in the above respective embodiments or examples, the rolling guide units are referred to for the guide support mechanism of a railway rolling stock, but the present invention is not limited to such specific utilization and many other applications may be adapted for guide mechanisms of, for example, various industrial robots or the like.

What is claimed is:

1. A rolling guide unit comprising:

a movable member provided with a main body portion and a pair of upper and lower support portions extending from lateral end portions of the main body so as to provide a recessed portion between the main body portion and both the support portions, said support portions having inner surfaces in which rolling member rolling grooves are formed;

a guide rail disposed in the recessed portion of the movable member so that upper and lower side surfaces of the guide rail face the inner surfaces of the support portions, respectively, the upper and lower side surfaces of said guide rail being formed with rolling member rolling grooves at positions cooperable with the rolling member rolling grooves of the upper and lower support portions, respectively, and the upper and lower side surfaces of said guide rail being substantially mutually parallel; and a number of rolling members disposed to be rollable between the cooperating rolling member rolling grooves of said guide rail and said upper and lower support portions of the movable member so that each of the rolling members contact their associated rolling member rolling grooves at two contact points at which the rolling members apply load to the rolling member rolling grooves, said movable member and the guide rail being relatively movable through the rolling of the rolling members;

wherein each of said rolling member rolling grooves has an arcuate cross sectional shape having a radius of curvature larger than that of the rolling member and the contact points are displaceable along the arcuate shape of the respective rolling member rolling grooves and;

wherein an initial contact angle formed between a line connecting the two contact points on diametrally opposite sides of the rolling members to the rolling member rolling grooves and a line passing through a center of the rolling member and parallel to the facing surfaces containing said rolling member rolling grooves in said movable member and said guide rail is set to substantially 90°.

2. A rolling guide unit according to claim 1, wherein the rolling member is a ball and each of said rolling member rolling grooves has a depth of approximately ¼ to ½ of a diameter of the ball.

3. A rolling guide unit according to claim 1, wherein a plurality of rolling member rolling grooves are formed at least one of the side surfaces of the guide rail and at least corresponding one inner surface of the support portion of the movable member.

4. A rolling guide unit according to claim 1, wherein a plurality of rolling member rolling grooves are formed at least on one of the side surfaces of the guide rail and at least on a corresponding one inner surface of the support portion of the movable member, and wherein an initial contact angle defined by a line connecting the two contact points of the rolling members in their associated rolling member rolling grooves and said line parallel to the facing surfaces containing said rolling member rolling grooves in said movable member and said guide rail passing a center of the rolling member is set to substantially 90°.

5. A rolling guide unit according to claim 4, wherein lines connecting points of contact between all of said rolling members and their associated rolling member rolling grooves when said movable member and said guide rail are misaligned have contact angles inclined in the same direction.

6. A rolling guide unit according to claim 4, wherein lines connecting points of contact between all of said rolling members and their associated rolling member rolling grooves when said movable member and said guide rail are misaligned have at least one pair of contact angles inclined in directions reverse to each other.

7. A rolling guide unit according to claim 1, wherein a plurality of rolling member rolling grooves are formed at least on one of the side surfaces of the guide rail and at least corresponding to one inner surface of the support portion of the movable member, and the rolling members disposed in at least one of the plurality of rolling member rolling grooves are formed as cylindrical members and the rolling member rolling groove in which the cylindrical members are rolled is formed so as to provide a flat groove bottom.

8. A rolling guide unit according to claim 7, wherein the rolling member rolling grooves for the cylindrical members are formed to the inner surfaces of the support portions so as to provide a groove bottom shape corresponding to an outer shape of the cylindrical member and the side surfaces of the guide rail for the cylindrical members are formed to be flat.

9. A rolling guide unit according to claim 7, wherein three rows of the rolling member grooves are formed and a central one is formed for the cylindrical members.

10. A rolling guide unit according to claim 1, wherein said guide rail has substantially rectangular cross section and is bent in a curved shape.

11. A rolling guide unit according to claim 1, wherein said guide rail has substantially linear shape.

12. A rolling guide unit according to claim 1, wherein retainer meals are disposed between the facing inner surfaces of the support portions of the movable member and the side surfaces of the rail guide.

13. A rolling guide unit according to claim 1, wherein said support portions are integrally formed with the main body portion of the movable member.

14. A rolling guide unit according to claim 1, wherein said support portions are independently formed with the main body portion of the movable member and the support portions are fixed to the central portion of the movable member by means of bolts.

15. A rolling guide unit according to claim 1, wherein the numbers of rows of the rolling members of the respective support portions are different from each other.

16. A rolling guide unit assembly which comprises a first member, and a second member disposed in an opposing relation with respect to the first member, and relatively movable along the first member through a pair of rolling guide units arranged on bilateral side surfaces of said first member, said pair of rolling guide units comprising:

guide rails respectively secured to both side surfaces of said first member;

a movable member secured to said second member disposed so as to oppose bilateral side surfaces of said guide rails and having a pair of upper and lower support portions extending along lateral side portions thereof by which the guide rails are clamped at upper and lower side surfaces thereof; and a number of rolling members rollably disposed in rolling member rolling grooves formed in the upper and lower side surfaces of the guide rails and opposing surfaces of the upper and lower support portions of the movable member in a mutually facing manner, wherein each of said rolling member rolling grooves has an arcuate cross section having a curvature larger than a radius of each of the rolling members so that the rolling members are movable along the arcuate shape of the rolling member rolling grooves; and wherein said guide rails are curved and each of said upper and lower side surfaces are parallel.

17. A rolling guide unit assembly according to claim 16, wherein each of said rolling member rolling grooves has a depth of approximately ¼ to ½ of a diameter of the rolling member.

18. A rolling guide unit assembly according to claim 16, wherein a plurality of rolling member rolling grooves are formed on at least one of the upper side surfaces and lower side surfaces of the guide rails.

19. A rolling guide unit assembly according to claim 18, wherein a contact angle is determined by a line connecting contact points of the respective rolling members in the bilateral pair of the rolling guide units to the rolling member rolling grooves and a line passing through centers of the rolling members parallel to said guide rail side surfaces, and where contact point connecting lines of the respective rolling members have a symmetrical arrangement.

20. A rolling guide unit assembly according to claim 18, wherein an initial contact angle constituted by a line connecting contact points of the rolling members to the rolling member rolling groove and a line parallel to said guide rail side surfaces and passing through a center of the rolling member is set to substantially 90°.

21. A rolling guide unit assembly according to claim 18, wherein the contact angles of a plurality of rolling members disposed on the upper side surface or the lower side surface of the guide rails are bilaterally symmetrical and have inclinations in the same direction with respect to the rolling guide units, respectively.

22. A rolling guide unit assembly according to claim 18, wherein a plurality of rows of the rolling members are disposed on at least one of the upper side surfaces and lower side surfaces of each of the guide rails, and further include cylindrical rolling members in at least one of said rows.

23. A rolling guide unit assembly according to claim 18, wherein the lines connecting contact points of a plurality of rolling members disposed on the upper side surface or the lower side surface are bilaterally symmetrically inclined and have at least one pair of lines reversely inclined with each other with respect to the rolling guide units.

24. A rolling guide unit assembly according to claim 16, wherein an elastic member is disposed between the movable member of the rolling guide unit and an attachment surface of the second member.

25. A rolling guide unit assembly according to claim 16 containing a plurality of movable members and wherein vertical mounting surfaces are formed on outer side surfaces of the movable members, each vertical mounting surface being respectively positioned opposite to one of the guide rails, and wherein horizontal mounting surfaces are formed on one of the upper and lower end surfaces of the movable members.

26. A rolling guide unit assembly according to claim 16, wherein each of the guide rails of the paired rolling guide units has a substantially rectangular cross section and being bent along a longitudinal axis to provide an arcuate portion, and said guide rails relatively swingably supporting the first member with respect to the second member.

27. A rolling guide unit assembly according to claim 26, wherein said first member is a pendulum type vehicle and said second member is a railway rolling stock which is swingably supported by the vehicle.

28. A rolling guide unit assembly according to claim 26, wherein said first member is fixed to a pendulum type vehicle and said second member is fixed to a pantograph.

29. A rolling guide unit comprising:

a relatively movable member provided with a main body portion and a pair of upper and lower support portions extending from lateral end portions of the main body portion so as to provide a recessed portion between the main body portion and both the support portions, said support portions having inner surfaces in which rolling member rolling grooves are formed;

a guide rail disposed in the recessed portion of the movable member so that upper and lower side surfaces of the guide rail face the inner surfaces of the support portions, respectively, the upper and lower side surfaces of said guide rail being formed with rolling member rolling grooves at positions corresponding to the rolling member rolling grooves of the upper and lower support portions, respectively;

a number of rolling members disposed to be rollable between the corresponding rolling member rolling grooves of said guide rail and said upper and lower support portions of the relatively movable member so that each of the rolling members contact the rolling member rolling grooves at two contact points and the rolling members apply load to the rolling member rolling grooves associated therewith, said movable member and the guide rail being relatively movable through the rolling of the rolling members;

a transporting element, positioned in the vertical direction with respect to relatively movable member and the guide rail mounted to one of the relatively movable member and said guide rail;

wherein each of said rolling member rolling grooves has a cross section of arcuate shape and having a radius of curvature larger than that of the rolling members, and the contact points are displaceable along the arcuate shape of the rolling member rolling groove;

wherein an initial contact angle formed between a line connecting the two contact points on the rolling members to the rolling member rolling grooves and a horizontal line passing through a center of the rolling member is set to substantially 90°; and wherein said horizontal line is perpendicular to said vertical direction and perpendicular to a direction of movement produced by said transportation element.

30. The rolling guide unit of claim 29, wherein said transporting element is a wheel.

31. The rolling guide unit of claim 29, wherein said transportation element is a bogie.

32. The rolling guide unit of claim 29, wherein said relatively movable member is fixedly mounted to said bogie.

* * * * *

UNITED STATES PATENT AND TRADEMARK OFFICE
CERTIFICATE OF CORRECTION

PATENT NO.:     5,957,586
DATED     :     September 28, 1999
INVENTOR(S):    OKAMOTO et al.

It is certified that an error appears in the above-identified patent and that said Letters Patent is hereby corrected as shown below:

On the title page of the patent change item [73] the Assignee, "THK Co. Ltd., Tokyo, Japan" to be --THK Co. Ltd., Tokyo, Japan and Railway Technical Research Institute, Tokyo, Japan--.

Signed and Sealed this

Twenty-seventh Day of June, 2000

Q. TODD DICKINSON

*Attest:*

*Attesting Officer*     *Director of Patents and Trademarks*